US006834049B1

(12) United States Patent
Tomar et al.

(10) Patent No.: US 6,834,049 B1
(45) Date of Patent: Dec. 21, 2004

(54) LAYOUTS FOR AN INTEGRATED CIRCUIT TO PERFORM TIME AND SPACE SWITCHING OF SONET FRAMED DATA

(75) Inventors: Sunil Tomar, Fremont, CA (US); Shashij Singh, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 754 days.

(21) Appl. No.: 09/661,494

(22) Filed: Sep. 14, 2000

(51) Int. Cl.[7] .................. H04L 12/66; H04L 12/28; H04Q 11/00; G06F 13/00; G06F 13/36

(52) U.S. Cl. .................. 370/369; 370/352; 370/388; 710/316

(58) Field of Search .................. 370/352, 359, 370/364, 369, 376, 378, 360, 382, 405, 451, 466, 388, 440, 455, 535; 709/221, 222, 223, 226, 278; 710/316, 317, 305

(56) References Cited

U.S. PATENT DOCUMENTS

| 4,736,361 | A | * | 4/1988 | Cooperman et al. | ......... 370/384 |
| 5,040,170 | A | * | 8/1991 | Upp et al. | ...................... 398/50 |
| 5,282,271 | A | * | 1/1994 | Hsieh et al. | ................... 326/38 |
| 5,428,800 | A | * | 6/1995 | Hsieh et al. | ................... 326/82 |
| 5,625,780 | A | * | 4/1997 | Hsieh et al. | ................ 710/316 |
| 5,914,952 | A | * | 6/1999 | Eom et al. | ................... 370/369 |
| 5,968,155 | A | * | 10/1999 | Davidson | .................... 710/126 |
| 6,580,709 | B1 | * | 6/2003 | Gorshe et al. | ............... 370/352 |
| 6,587,470 | B1 | * | 7/2003 | Elliot et al. | .................. 370/404 |
| 6,597,214 | B1 | * | 7/2003 | Singh et al. | ................. 327/141 |
| 6,667,973 | B1 | * | 12/2003 | Gorshe et al. | .............. 370/376 |
| 6,680,938 | B1 | * | 1/2004 | Hammermeister et al. | .. 370/360 |

FOREIGN PATENT DOCUMENTS

GB 2296159 6/1996

OTHER PUBLICATIONS

International Preliminary Examination Report, Aug. 6, 2003, from International Application No. PCT/US01/28755.

* cited by examiner

Primary Examiner—Huy D. Vu
Assistant Examiner—M. Phan
(74) Attorney, Agent, or Firm—Michael R. Cammarata; Paul A. Mendensa

(57) ABSTRACT

Methods and apparatuses for laying out an integrated circuit include a first plurality of I/O ports that are positioned along the first side, a plurality of queues that are coupled to the first plurality of I/O ports, a first bus that is positioned extending from the plurality of queues toward the second side to couple a control circuit to the plurality of queues, second plurality of I/O ports that are positioned along the third side and the fourth side, and a second bus that is positioned between the control circuit and the second plurality of I/O ports to couple the control circuit to the second plurality of I/O ports, wherein the first bus and the second bus are positioned such that the respective bus lines do not cross over each other. A time and space switching apparatus and component cell permit a bit within a data line to be selected.

15 Claims, 25 Drawing Sheets

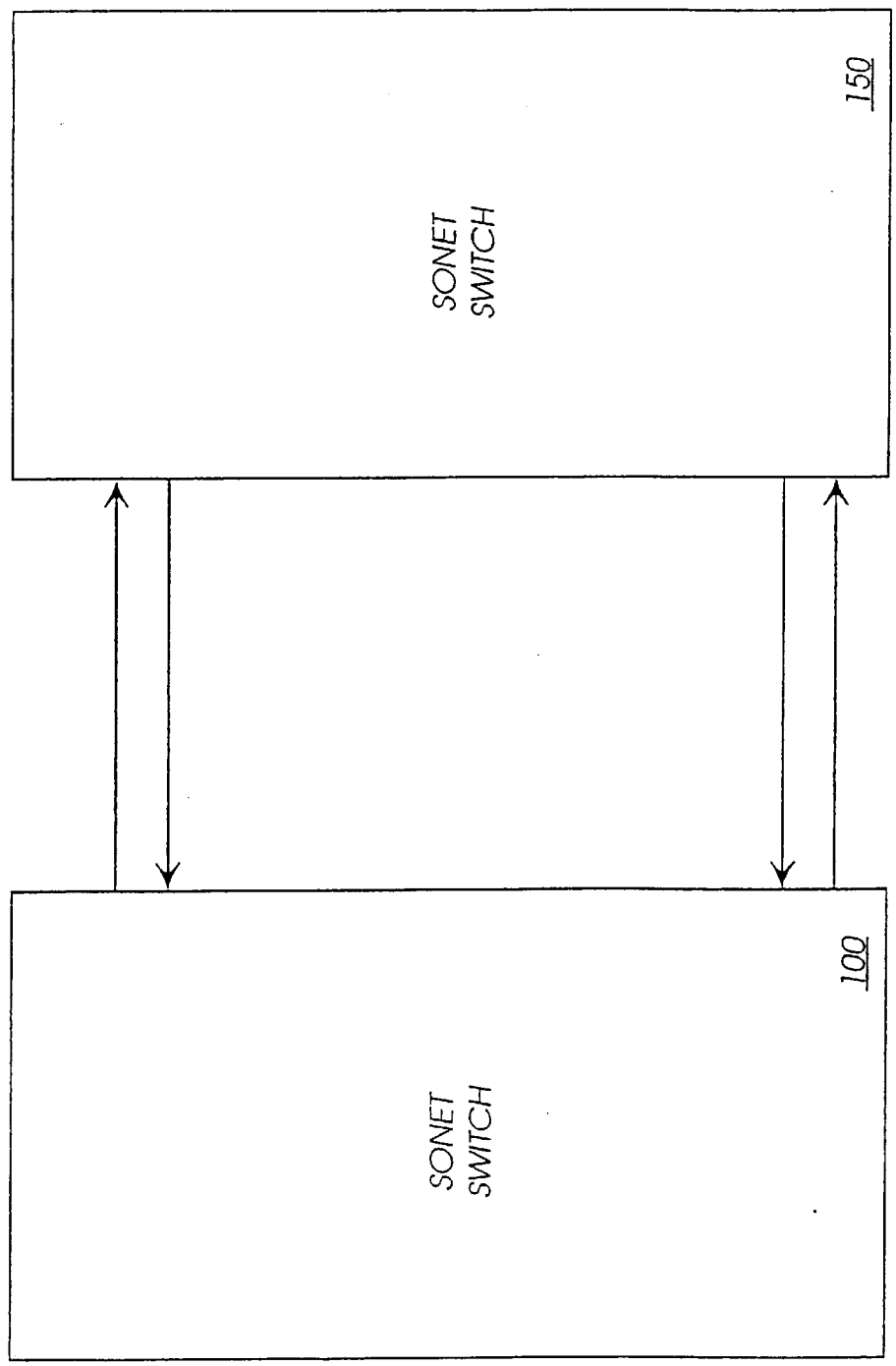

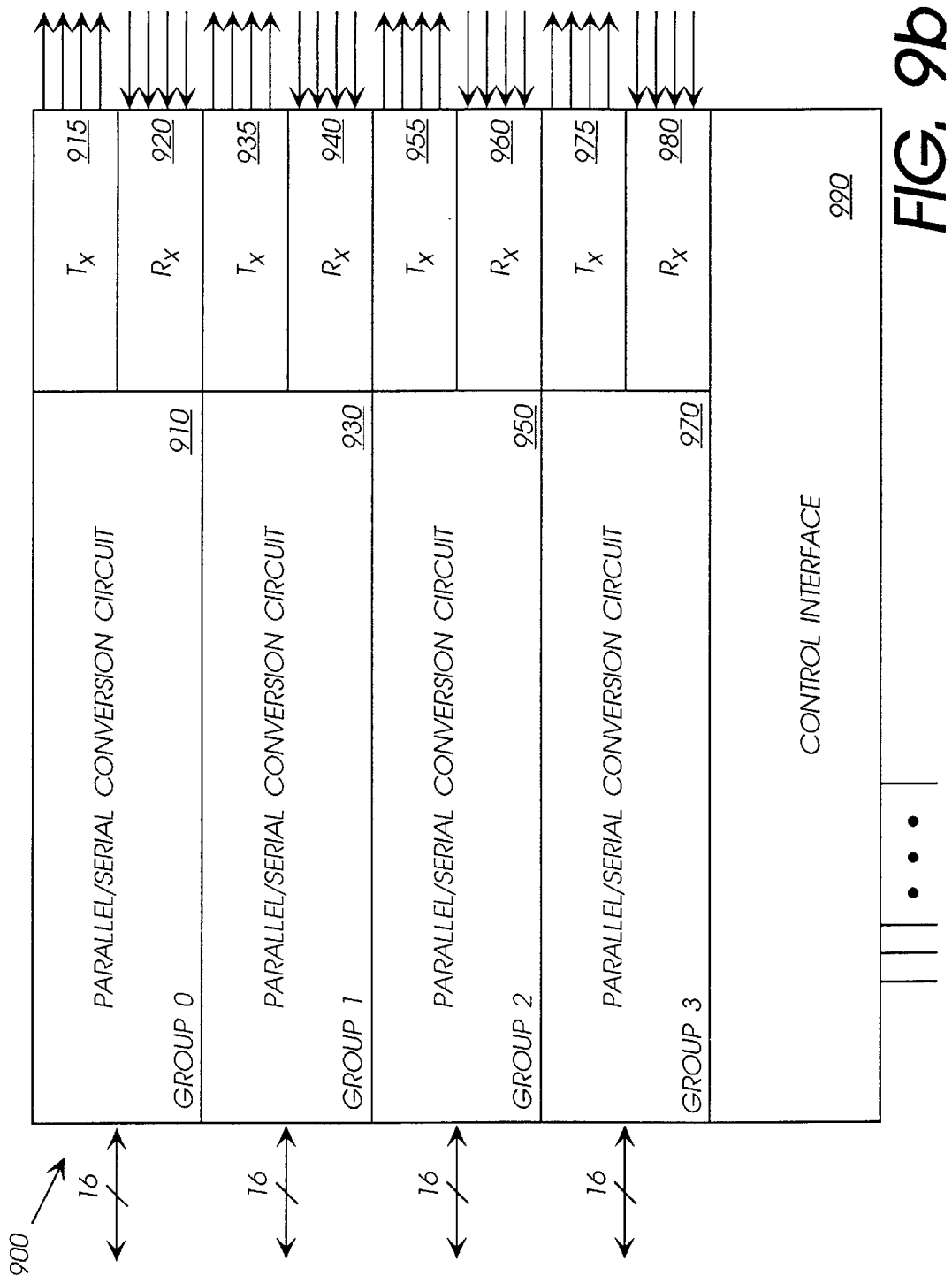

LAYOUTS FOR AN INTEGRATED CIRCUIT TO PERFORM TIME AND SPACE SWITCHING OF SONET FRAMED DATA

FIELD OF THE INVENTION

The invention relates to digital data processing. More particularly, the invention relates to an integrated circuit for time and space switching of digital data.

BACKGROUND OF THE INVENTION

With the maturation of the computer and surrounding technologies, vast amounts of complex, mixed traffic types are transmitted through synchronous optical networks (SONETs). The SONET standard is described in the American National Standards Institute (ANSI) standards T1.105 and T1.106 and in the Bellcore Technical Recommendations TR-TSY-000253. However, current SONET infrastructure has not kept pace with this rapid information technology shift and, as a result, network throughput is slowing down significantly due to increased traffic load.

Carriers that operate SONET-based metropolitan area networks (MANs) are especially impacted by this growing congestion. These carriers operate SONET rings to provide carrier services. SONET, and its international variant, Synchronous Digital Hierarchy (SDH), are deployed throughout North America, Latin America, Europe, the Pacific Rim and Asia. SONET and SDH are the de facto standard for physical layer optical transport. SONET provides massive transport scalability and the ability to support numerous network elements (NEs).

Traditional SONET signals were designed based on strictly defined and "chunky" telco line rates. Regardless of composition and requirements under such strictly defined line rates, traffic must fit into a specific bandwidth slot whether or not the traffic uses the full bandwidth allocation. Besides these limitations, current SONET equipment does not support non-voice digital data such as Ethernet traffic, local area network (LAN) traffic, asynchronous transfer mode (ATM) traffic, frame relay (FR) traffic, Internet Protocol (IP) traffic. Further, traditional SONET signals are inefficient when carrying non-voice data signals.

The basic building block of SONET networks is the SONET ring connection. FIG. 1a illustrates a basic SONET ring connection. SONET switch 100 and SONET switch 150 receive optical signals from various devices (not shown in FIG. 1). SONET switch 100 and SONET switch 150 can be coupled to other SONET switches, or other devices that communicate data using optical signals.

SONET switch 100 and SONET switch 150 communicate using two sets of uni-directional signaling pairs. In general, half of the traffic between switches travels over one of the signaling pairs and the other half of the traffic travels over the other signaling pair. SONET switches communicate according to a predetermined protocol, and at a predetermined bit rate.

Telecommunications (Telco) SONET systems have been designed and implemented using digital signaling (DS) technology, which is well known in the art. In the tables that follow, bit rates are set forth as bits per second (bps) and multiples thereof. The following Telco hierarchy provides a foundation for the SONET hierarchy set forth below.

TABLE 1

Telco Hierarchy

| Signal | Bit Rate | Channels |
|---|---|---|
| DS0 | 64 kbps | 1 DS0 |
| DS1 | 1.544 Mbps | 24 DS0s |
| DS2 | 6.312 Mbps | 96 DS0s |
| DS3 | 44.736 Mbps | 28 DS1s |

SONET signals are Synchronous Transport Signals (STS) and Optical Carrier (OC) signals. Common SONET protocols include the following:

TABLE 2

SONET Hierarchy

| Signal | Bit Rate | Capacity |
|---|---|---|
| STS-1, OC-1 | 51.840 Mbps | 28 DS1s or 1 DS3 |
| STS-3, OC-3 | 155.520 Mbps | 84 DS1s or 3 DS3s |
| STS-12, OC-12 | 622.080 Mbps | 336 DS1s or 12 DS3s |
| STS-48, OC-48 | 2488.320 Mbps | 1344 DS1s or 48 DS3s |
| STS-192, OC-192 | 9953.280 Mbps | 5379 DS1s or 192 DS3s |

The following table describes SONET inefficiencies when carrying Ethernet signals; however, other protocols can be similarly inefficient.

TABLE 3

Ethernet/SONET inefficiencies

| Ethernet | Signal | Bit Rate | Wasted Bandwidth |
|---|---|---|---|
| 10 BaseT (10 Mbps) | STS-1, OC-1 | 51.840 Mbps | 80.7% |
| 100 BaseT (100 Mbps) | STS-3, OC-3 | 155.520 Mbps | 35.7% |
| Gig. E (1000 Mbps) | STS-48, OC-48 | 2488.320 Mbps | 59.8% |

In SONET networks, network elements typically convert electrical signals are converted to optical signals for transport over SONET connections. The data, however, is generated and manipulated as electrical signals. For example, telephones convert audio signals to analog electrical signals, which are converted to digital electrical signals and finally to optical signals. Computer systems generate analog and/or digital signals, which are converted to optical signals. The optical signals are transported over SONET connections.

FIG. 1b illustrates an example of conversion of electrical signals to optical SONET data. User data 110 can be any type of digital data, for example, a file generated by a computer system, LAN traffic, or a telephone call that has been converted to digital signals. User data 110 coming into the SONET system is typically data based on the Telco hierarchy. Thus, prior to the transport of OC signals, the first stage of the SONET transport mechanism usually creates, multiplexes, and manages SONET signals in their electrical format (e.g., as STS signals).

User data 110 is sent to SONET multiplexing device 140 that adds a path overhead header (POH) to user data 110 to generate a synchronous payload envelope (SPE) 115. subsequently, SONET multiplexing device 140 adds a transport overhead header (TOH) and STS frame 120 is formed. STS frame 120 is sent to electrical-optical conversion unit 125, which creates OC-1 signal 130.

STS frame 120 can include various frame sizes and may also be transported at various speeds. A standard building block for the STS frame is the STS-1 protocol, which specifies 810 bytes transmitted every 125 microseconds (μsec), resulting in a line rate of 51.840 Mbps. Accordingly, in FIG. 1b, an electrical 51.840 Mbps line signal generated by STS-1 frame 120 would result in an optical OC-1 signal on the output of electrical-optical conversion unit 125.

The output of electrical-optical conversion unit 125 can be provided to a second stage of a SONET transport mechanism (not shown in FIG. 1b) that is used to groom multiple signals and add/drop OC-1 signals to create, for example, OC-3 or OC-12 signals. Using this multiple staging format, conventional optical network systems provide a flexible design that creates a robust transport layer for various data formats.

The multiple staging of optical network systems, however, requires a large number of varying components to handle the different levels of communication signals. Accordingly, the cost of development for conventional optical network systems, and the cost of maintaining conventional optical systems is high. Additionally, each time a new communications signal is introduced to an existing SONET transport mechanism, the staging system that receives/transports the new signal must be reconfigured and/or replaced with a new staging system. Accordingly, the integration of multiple staging components would be a desired result. The integration of these multiple staging components into a single optical network design, however, results in several disadvantages.

FIG. 2 illustrates a basic SONET architecture having multiple SONET switches communicating at different bit rates. In general, the SONET architecture of FIG. 2 illustrates Metro Access loops and a Metro Transport loop. Metro Access loops are relatively low speed (e.g., OC-3, OC-12) connections between SONET switches, such as SONET switches 210 and 260, and other devices, such as IP device 200 and FR device 205 coupled to SONET switch 210 and DSL device 270 and Ethernet device 275 coupled to SONET switch 260.

SONET switch 210 is coupled to SONET switch 220 via two OC-3 connections. As mentioned above, each SONET connection includes two uni-directional connections having the same bit rate. SONET switch 260 is coupled to SONET switch 250 via two OC-12 connections. SONET switch 220 is coupled to SONET switch 230 via two OC-48 connections and to SONET switch 240 via two OC-48 connections. SONET switch 250 is coupled to SONET switch 230 via two OC-192 connections and to SONET switch 240 via two OC-192 connections.

The Metro Access loops generally communicate with devices other than SONET switches to bring data into the SONET ring. Therefore, the SONET switches in the Metro Access loops generally communicate at lower bit rates than could otherwise be possible using optical technology.

The SONET switches of the Metro Access loops communicate with SONET switches of the Metro Transport at higher bit rates than with the non-SONET switch devices. In the Metro Transport communications, multiple Metro Access data streams can be combined and be communicated through the network at a higher bit rate than what is supported by the non-SONET switch devices. However, as described above, SONET communications can be bandwidth inefficient when communicating at any bit rate.

Recently, "data-aware SONET" has been developed that provides statistical multiplexing and traffic oversubscription, both of which provide more efficient data transfer. However, current switches are limited to OC-12 line rates. Another deficiency of current SONET equipment is that separate aggregators are required at each line rate. For example, an aggregator receives multiple STS-3 signals and combines them into a single STS-12 or STS-48 signal. Further aggregation is provided by additional aggregation equipment. What is needed is an improved SONET equipment architecture.

SUMMARY OF THE INVENTION

Methods and apparatuses for laying out an integrated circuit having a first side and a second side opposite each other and a third side and a fourth side opposite each other are described. In one embodiment, a first plurality of input/output (I/O) ports are positioned along the first side, a plurality of queues are coupled to the first plurality of I/O ports, a first bus is positioned extending from the plurality of queues toward the second side to couple a control circuit to the plurality of queues, second plurality of I/O ports are positioned along the third side and the fourth side, and a second bus is positioned between the control circuit and the second plurality of I/O ports to couple the control circuit to the second plurality of I/O ports, wherein the first bus and the second bus are positioned such that the respective bus lines do not cross over each other. dr

BRIEF DESCRIPTION OF THE DRAWINGS

The invention is illustrated by way of example, and not by way of limitation, in the figures of the accompanying drawings in which like reference numerals refer to similar elements.

FIG. 1a illustrates a basic synchronous optical network (SONET) ring connection.

FIG. 9b is a block diagram of one embodiment of a high speed serial switching ASIC (HISSA).

DETAILED DESCRIPTION

Figure 1B:
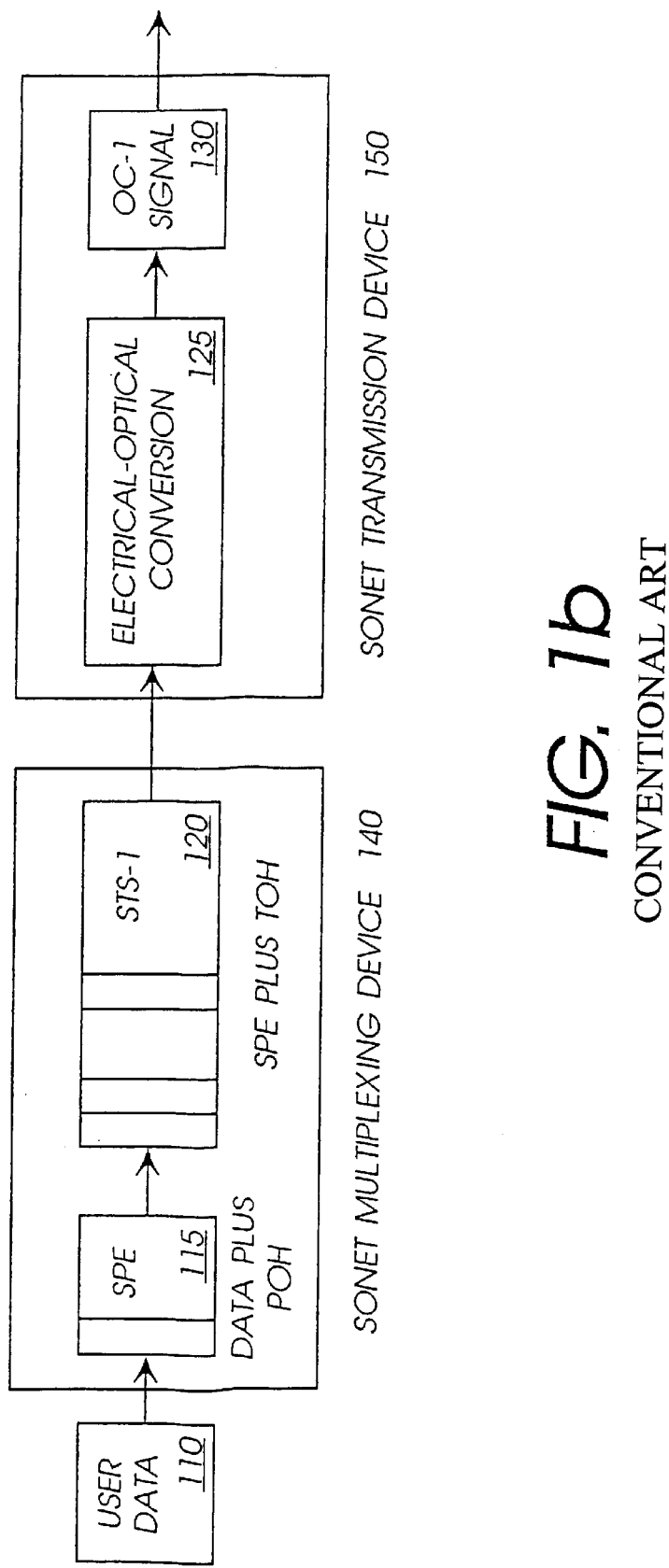
FIG. 1b illustrates an example of conversion of electrical signals to optical SONET data.
Figure 2:
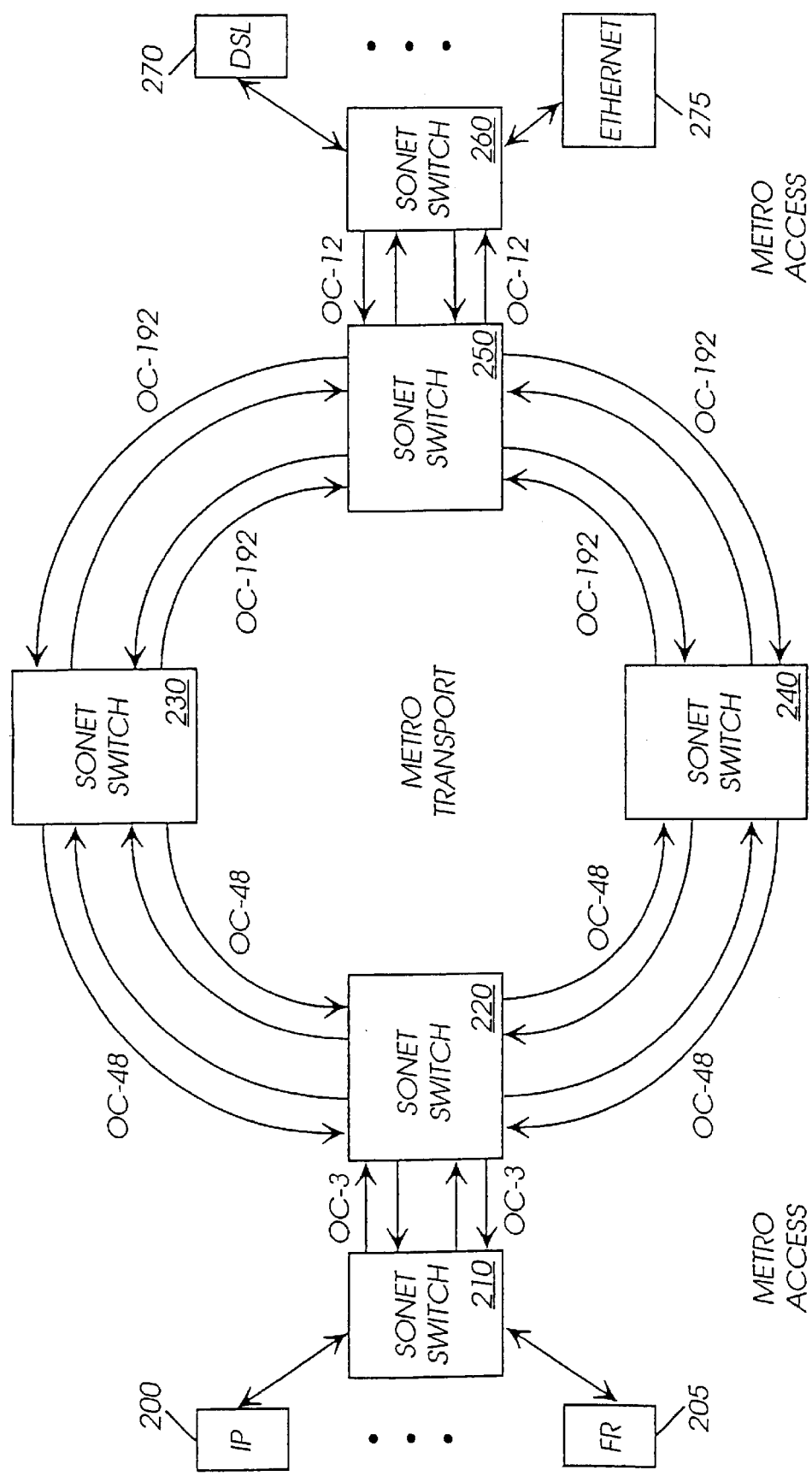
FIG. 2 illustrates a basic SONET architecture having multiple SONET switches communicating at different bit rates.

Methods and apparatuses for and related to SONET data manipulation are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The description herein is set forth in terms of SONET hierarchies and protocols; however, the description applies equally to SDH hierarchies and protocols as well. Described herein are components of, and operations within, a switching system that performs switching and routing between interface cards coupled via a backplane. In one embodiment, cross-connect components switch SONET formatted data. In one embodiment, the switching system interface cards envelope data in a SONET based format that includes B1 bit error checks, framing, and scrambling. To provide sufficient bandwidth time and space switching is accomplished by an application specific integrated circuit (ASIC) described in greater detail below. The Time and Space Switching ASIC is referred to herein as a "TISSA". In one embodiment, the TISSA is an independent integrated circuit.

In one embodiment, the TISSA is a 16×11 device that has 16 STS-48 input ports on a first side and 11 STS-48 output ports on a second and/or third side and both the I/O ports and the TISSA operate a 155 MHz internal clock. The clock frequencies are selected for SONET specification compliance, and are not limited by the ASIC design. Other clock frequencies could be used for different applications. Also, other I/O port layouts can be provided.

The operational speed set forth above allows the TISSA to switch an entire STS-48 frame between two ports within an 48 clock cycle window. The operational speed also allows the TISSA to select an STS-1 signal from an STS-48 input frame on a first port and switch the selected STS-1 signal to a second port within an 48 clock cycle window. In alternate embodiments, the TISSA can switch data using four byte groupings of data. TISSA switching characteristics apply to other signal rates (e.g., STS-3, STS-12) as well.

As described in greater detail below, the switching system can include various interface cards that support transmission of DS-N, Ethernet, and OC-N signals, where N is any SONET supported (e.g., 1, 3, 12, 48, 192, 768) data rate. Further, the DS-N cards can be configured to receive/transmit signals in a frame relay (FR) or asynchronous transfer mode (ATM) format. The data transfer between the various communications cards and the TISSA is performed by a second ASIC, referred to as a High Speed Serial ASIC, or HISSA. In one embodiment, the HISSA operates on a 77 MHz clock. The HISSA generates SONET formatted data and reduces the footprint created by the witching system backplane interface between the communications cards and the cross-connect card. This results in improved signal integrity, any service in any slot, and differential pair signaling to transmit data at higher frequencies while reducing signal lines.

In one embodiment, the HISSA generates SONET formatted data by performing bit stuffing and bit destuffing and scrambling for phase locked loop (PLL) locking. In one embodiment, the HISSA reduces the backplane footprint by transforming the communications card parallel signals to serial signals and thereafter reversing the parallel-to-serial conversion on the cross-connect card. For example, in one embodiment, the switching system supports STS-48 communication bandwidth between cards. Accordingly, the HISSA uses differential pair circuitry to generate eight lines (each pair operating at 622 MHz) that transfer the data between the communications card and the cross-connect card. Subsequently, another HISSA in the cross-connect card regenerates the STS-48 data prior to TISSA data switching.

In one embodiment, the communications cards have the ability to convert a data protocol within the card. For example, the switching system could receive a DS-3 frame relay input on a first card and switch the signal to an OC-3 output on a second card. In particular, the HISSA/TISSA switching results in a SONET format output being transferred to the second card via the backplane. Additionally, the second card could also be configured to switch the data output on the card into an ATM format. Accordingly, the output of the second card would be a SONET based OC signal in an ATM, or other, format. This feature allows the switching system to integrate seamlessly with conventional SONET ring systems that use large scale ATM switches to manipulate data transmissions.

Network Architecture Overview

Figure 3:
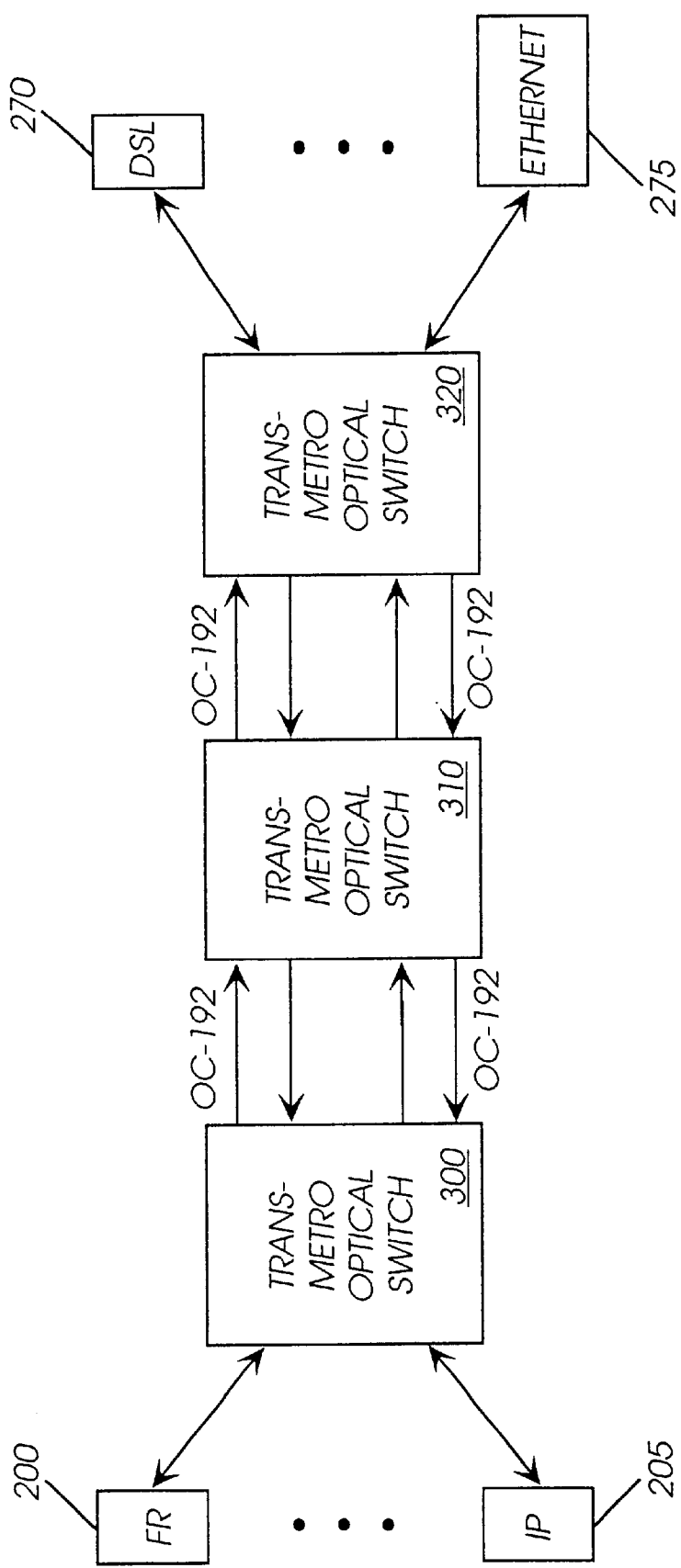
FIG. 3 illustrates one embodiment of a SONET architecture having Trans-Metro Optical (TMO) switches.

FIG. 3 illustrates one embodiment of a SONET architecture having Trans-Metro Optical (TMO) switches. As described in greater detail below, TMOs provide multiple functions and allow non-voice data to be carried in a more efficient manner than typical SONET switches. FIG. 3 provides an example of a network having TMOs; however, the description of FIG. 3 in not intended to limit in any way the potential uses of a network having one or more TMOs.

In one embodiment, each TMO provides signal aggregation/concentration and time and space switching. Because multiple functionalities are provided by a single network device, fewer network devices are required than in current SONET networks. As described in greater detail below, the cards inserted into the TMO determines the functionality of the TMO, and the TMO can support any provided functionality from any card slot.

TMO 300 is coupled to FR device 200 and to IP device 205. TMO 300 can also be coupled to other devices such as local area networks, ATM devices or PBXs (not shown in FIG. 3). Similarly, TMO 320 is coupled to DSL device 270 and to Ethernet device 275. TMO 320 can also be coupled to other devices, such as Terabit routers or optical cross-connects (not shown in FIG. 3).

TMO 300 and TMO 320 provide an interface between a SONET ring and customer premises and/or other non-SONET equipment. Signals passed between FR device 200, IP device 205, or other device (not shown in FIG. 3) are typically electrical signals; however optical signals can also be supported. Similarly, DSL device 270, Ethernet device 275, or other devices (not shown in FIG. 3) communicate with TMO 320 via electrical and/or optical signals.

TMO 300 is coupled to TMO 310 in the same manner as SONET switches are interconnected. The connection between TMO 300 and TMO 310 is illustrated as OC-192; however, any SONET line rate can be used. Similarly, TMO 320 is illustrated coupled to TMO 310 with OC-192 line rate connections, while other line rates can be used.

In general, each TMO provides multiple SONET platforms into a single TMO platform. In one embodiment, each TMO provides switching scalability from DS-1 to OC-768, full function add/drop multiplexer (ADM) capabilities, multi-service circuit and packet provisioning, and advanced bandwidth optimization and management. In alternate embodiments, other SONET protocols (e.g., bit rates greater than OC-768) can also be supported. Switching and routing capabilities are described in greater detail below.

TMOs are data-optimized SONET transport platforms. In one embodiment, TMO switching gear utilizes HISSAs and TISSAs to perform many of the core functionalities. As a result, the TMO switch form factor is substantially smaller and consume less power than current rack mount SONET systems. In general, the TISSA provides the ability to convert data between formats so that the data can be communicated using high speed SONET protocols, for example, OC-192. The HISSA supports the ability to route signals between TISSAs. The combination of TISSAs and HISSAs results in a powerful SONET switching platform.

TMOs can be used to transition SONET to a data-centric traffic model by simplifying current MAN topologies. Using TMOs, carrier customers retain their LAN protocol (Ethernet, ATM, FR, IP) and time division multiplex (TDM) services, which allows the customers to preserve their technology investment while receiving the benefit of improved SONET communications.

Within existing MAN topologies, service access multiplexers can be replaced with TMO switches at the ingress/egress points of OC-12 to OC-192 local loops and at OC-48 to OC-768 MAN edges. TMO switches support the full range of SONET line rates, and eliminate the discrete network elements previously required at each add/drop point. TMO switching can also be used to interconnect MAN edges with the network core. Here, core ATM switches groom aggregated traffic for transport over long haul OC-192/OC-768 connections. In one embodiment, TMO switches offer 4:1 statistical multiplexing so bandwidth is more effectively used in point-to-point SONET links.

Figure 4:
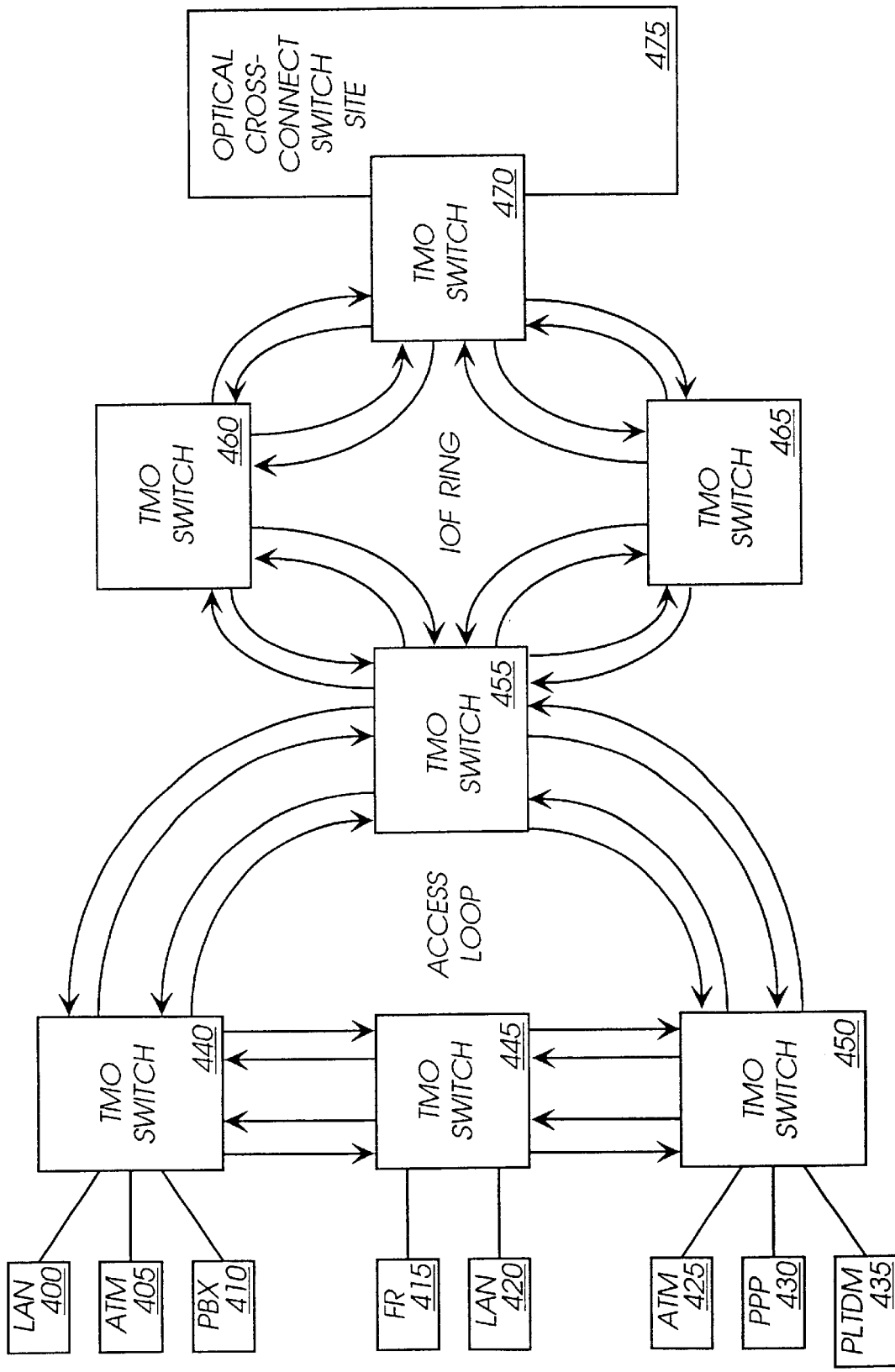
FIG. 4 illustrates one embodiment of TMO traffic aggregation.

FIG. 4 illustrates one embodiment of TMO traffic aggregation. TMO switches 440, 445, 450 and 455 provide an access loop that operates to couple customer devices to a SONET ring. The customer devices are coupled to the respective TMO switches in the same manner as the customer devices would be coupled to a SONET switch.

LAN 400, ATM network 405 and PBX 410 are coupled to TMO switch 440. FR device 415 and LAN 420 are coupled to TMO switch 445. ATM network 425, PPP 430 and PLTDM 435 are coupled to TMO switch 450. TMO switches 440, 445, 450 and 455 are interconnected to provide an Access Loop. TMO switch 455 provides an interface between the Access Loop and an IOF Ring provided by TMO switches 455, 460, 465 and 470. TMO switch 470 provides an interface between the IOF ring and optical cross-connect site 475.

Switch Architecture Overview

Figure 5:
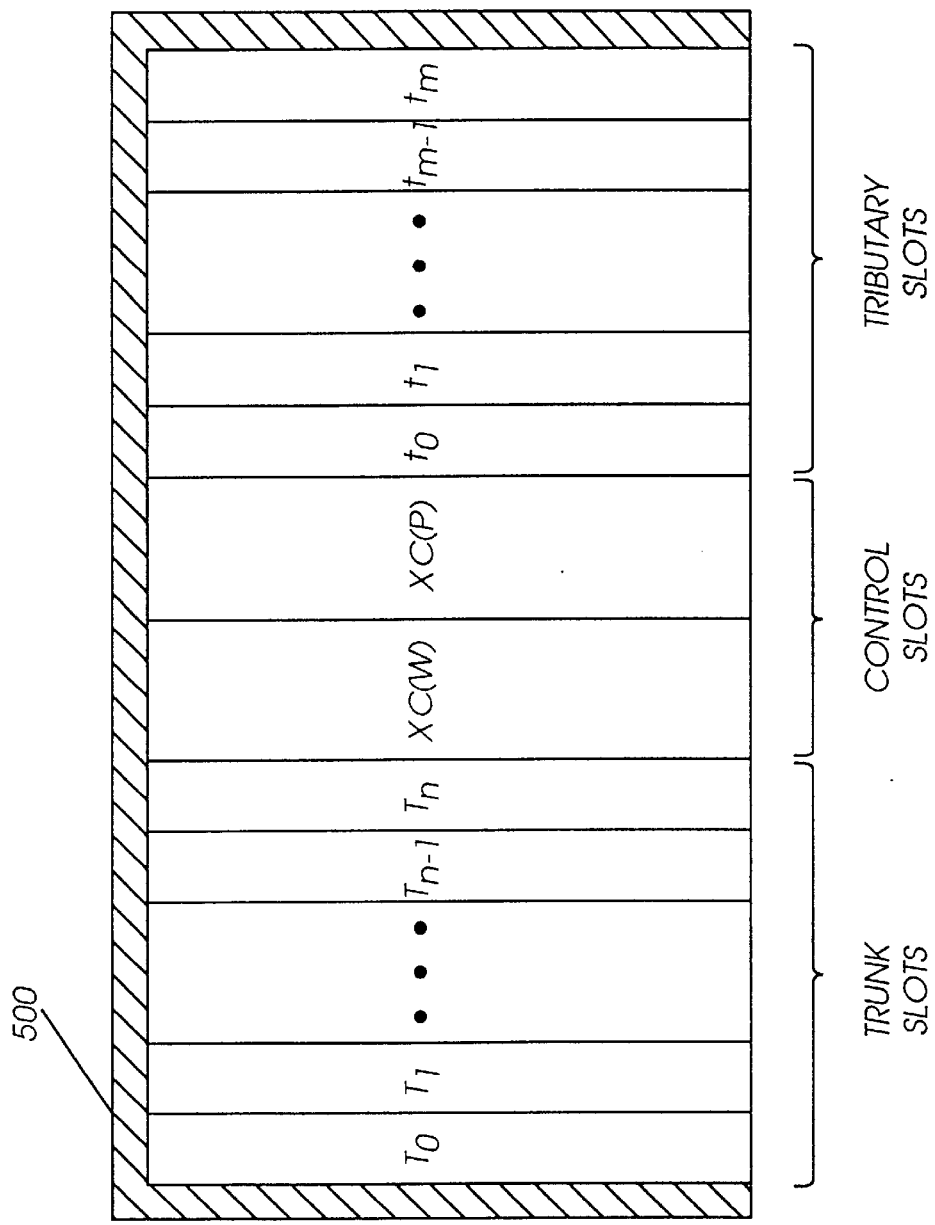
FIG. 5 illustrates a conceptual view of one embodiment of a TMO switch configuration.

FIG. 5 illustrates a conceptual view of one embodiment of a TMO switch configuration. In one embodiment, a TMO switch includes a backplane (not shown in FIG. 5) that interconnects multiple cards that are inserted into slots in TMO switch body 500. In one embodiment, the TMO switch has two cross-connect (XC) cards, one of which is active, or the working cross-connect (XC-W), and the other of which is a protection cross-connect (XC-P) that provides redundancy for the working cross-connect.

Interface cards are divided into two categories: trunk cards and tributary cards. In one embodiment, trunk cards ($T_0$ through $T_n$) are positioned on one side of the cross-connect cards and tributary cards ($t_0$ through $t_m$) are positioned on the opposite side of the cross-connect cards. In general, trunk cards are used to provide an interface to one or more other devices using high speed SONET connections (e.g., OC-192, OC-768) and tributary cards are used to provide interfaces to one or more lower speed devices (e.g., DS1, ATM, FR, DS3).

The cross-connect card allows data to be communicated between tributary cards and trunk cards. For example, multiple DS3 tributary cards can receive data from multiple sources and the data received via the tributary cards can be combined and communicated to another TMO switch via an OC-48 connection. Alternatively, multiple Ethernet and IP cards and receive data from multiple LANs and the data can be combined and transmitted using a SONET protocol where the bandwidth of the SONET protocol is more effectively used than if the data were transmitted as described above with respect to Table 3.

Figure 6:
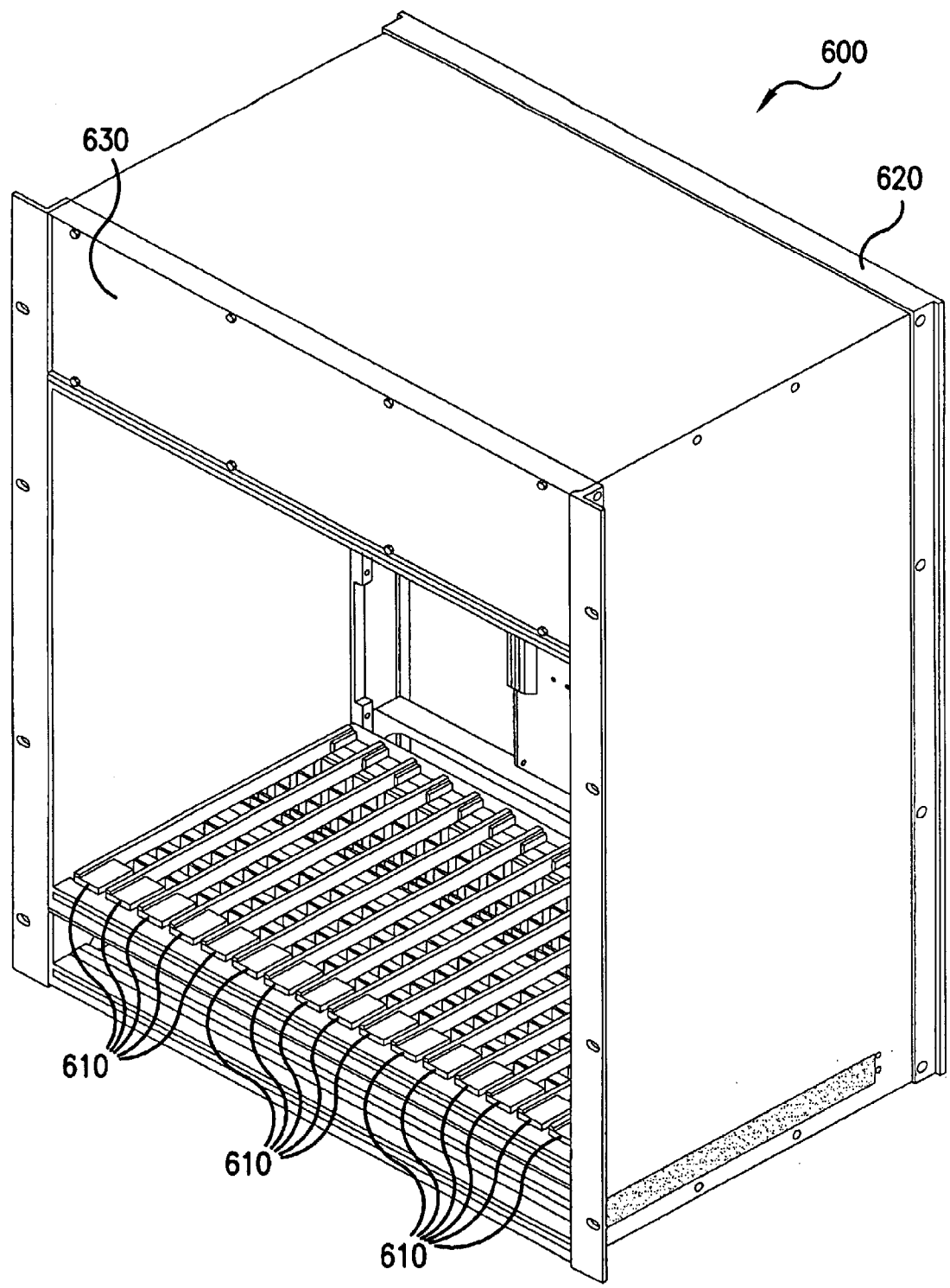
FIG. 6 is a perspective view of one embodiment of a TMO switch chassis.

FIG. 6 is a perspective view of one embodiment of a TMO switch chassis. Chassis 600 includes multiple slots to receive cards (not shown in FIG. 6) that provide an interface for multiple types of network communications. For example, a card can receive and transmit data according to Ethernet protocols, STS-1 protocols, or OC-48 protocols, or any other network communications protocol.

Cards are inserted into one or more of slots 610. In one embodiment, each slot provides the same card interface. Thus, any card can be inserted into any slot. In other words, any service can be provided by any slot. In one embodiment, one or more predetermined slots are reserved for cross-connect cards. The cross-connect cards have a different interface than the non-cross-connect cards.

Chassis 600 includes a backplane in the rear portion 620 of chassis 600. The backplane interconnects the various card slots with the cross-connect card slots. In one embodiment, the backplane communicates data using differential pair signaling at a rate of 622 Mbits/sec; however, other frequencies can be used based on, for example, physical line lengths, card data rates, or other factors.

In one embodiment, data is communicated over the backplane in a SONET format. Each trunk or tributary card converts incoming data to SONET format for communication to the cross-connect card. The cross-connect card performs time and space switching on the SONET formatted data. Each trunk or tributary card receiving data receives the data in SONET format and converts the data, if necessary, to the proper outgoing format.

Because each card transmits or receives SONET formatted data and the cross-connect cards switch SONET formatted data, any card can be inserted into any non-cross-connect slot and operate as designed. Thus, users of the TMO are not limited to using predetermined sets of cards with predetermined sets of slots. By providing any service from any (non-cross-connect) slot, the TMO is more flexible and more powerful than it would be otherwise.

In one embodiment, cooling fans, power supplies and/or other components can be included in upper portion 630. Any manner of providing sufficient power and cooling known in the art can be used with chassis 600.

Figure 7:
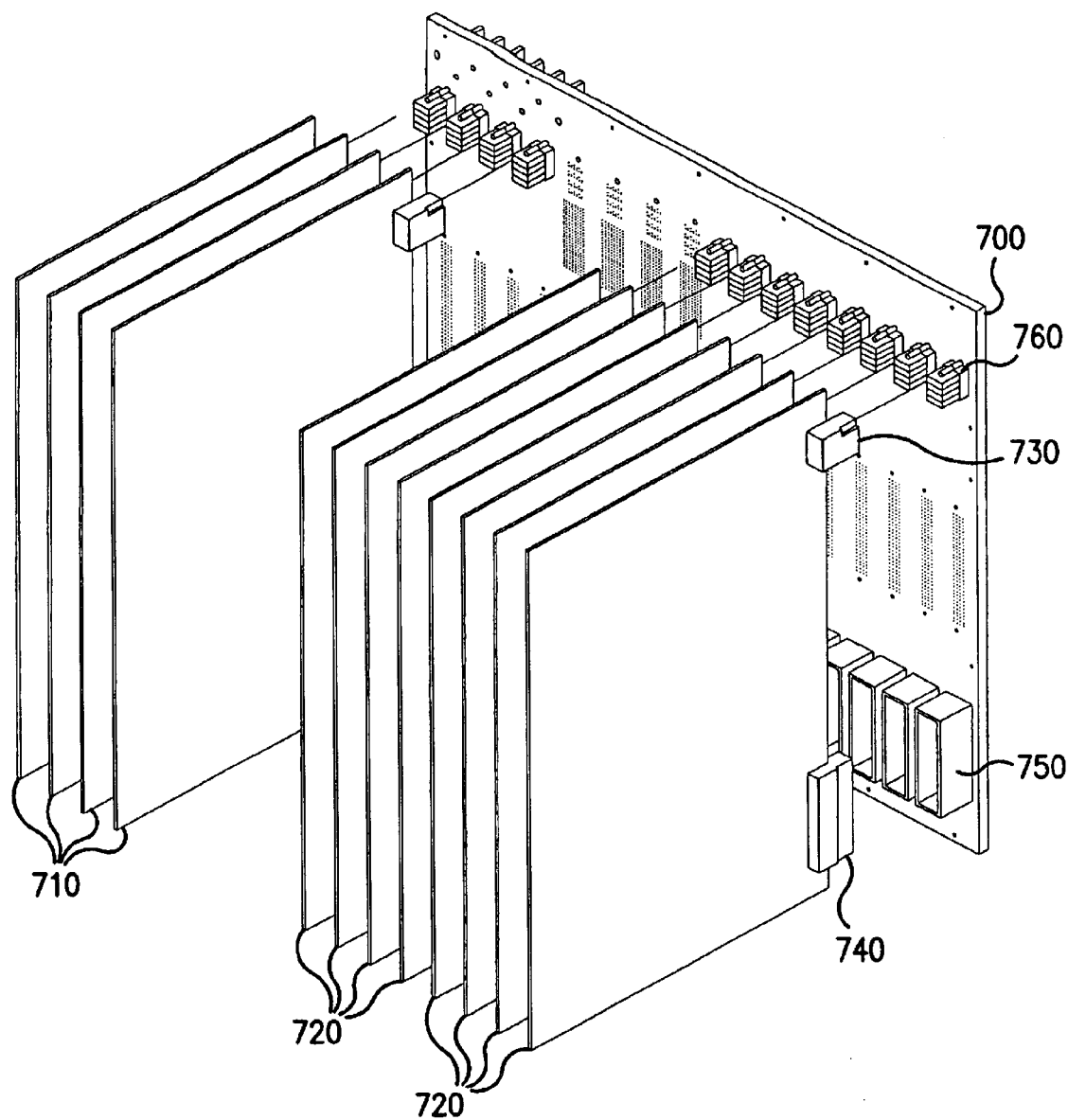
FIG. 7 illustrates multiple cards to be coupled with a backplane.

FIG. 7 illustrates multiple cards to be coupled with a backplane. For reasons of simplicity, cross-connect cards are not illustrated in FIG. 7. In the example of FIG. 7, trunk cards 710 are grouped on one side of the cross-connect slots and tributary cards 720 are grouped on the opposite side of the cross-connect slots; however, other configurations can also be provided.

Each card, whether a trunk card or a tributary card, has the same electrical interface, as described above. Similarly, each slot has a corresponding counterpart electrical interface. In one embodiment, cards include connector 730 and connector 740. Backplane 700 includes connectors 750 and 760 to interconnect with connectors 740 and 730, respectively. In one embodiment, connectors 740 and 750 provide one or more differential pair serial communication lines between a card and the backplane.

Signals received from a card are routed, via backplane 700, to a cross-connect card (not shown in FIG. 7). The cross-connect card provides time and space switching of signals and outputs one or more data signals in the same format as the signals received from backplane 700. The signals output by the cross-connect card are routed to the appropriate card by backplane 700.

Figure 8:
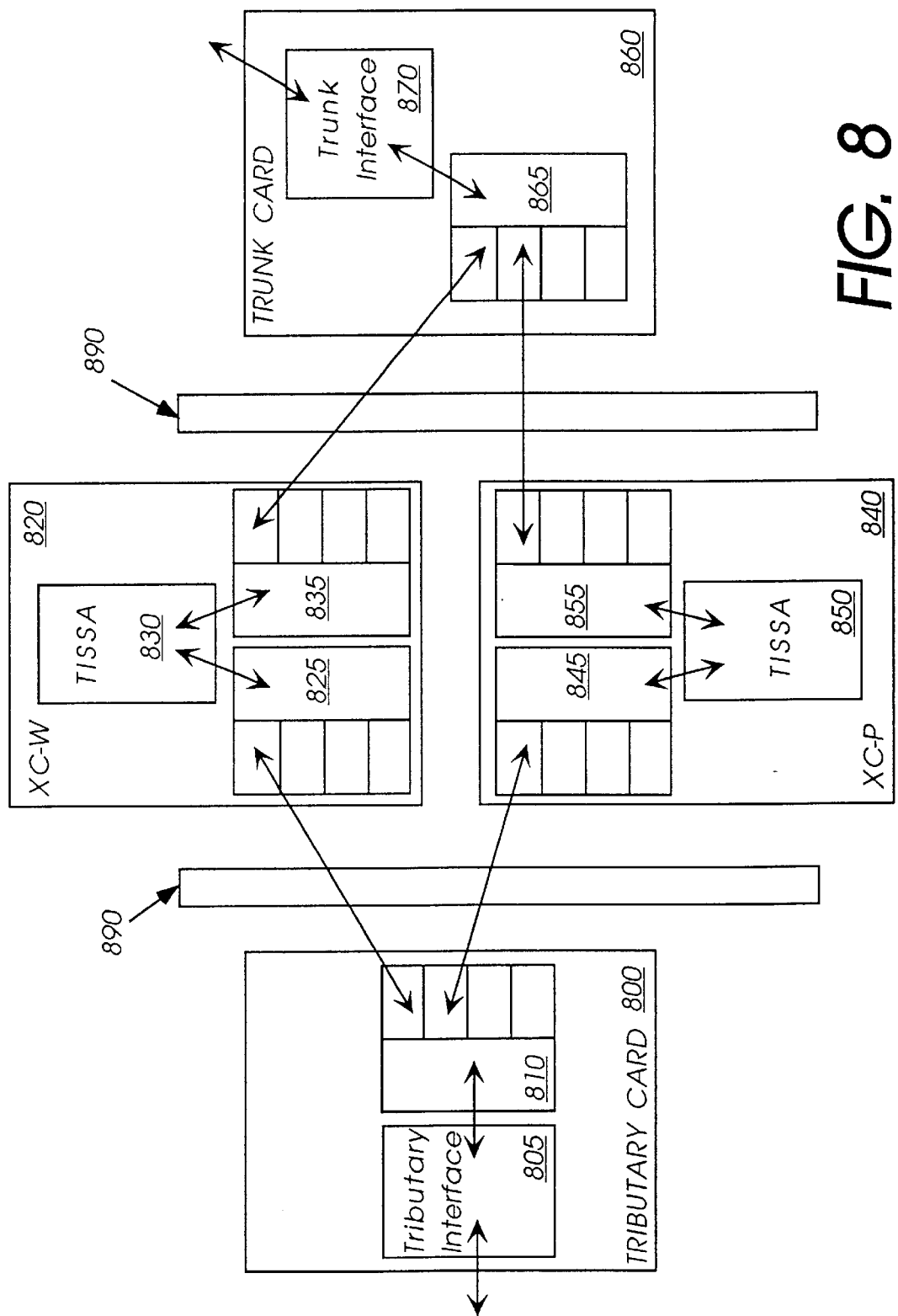
FIG. 8 illustrates one embodiment of an interconnection of a trunk card, a working cross-connect card, a protection cross-connect card and a tributary card.

FIG. 8 illustrates one embodiment of an interconnection of a trunk card, a working cross-connect card, a protection cross-connect card and a tributary card. While the example of FIG. 8 describes a single trunk card coupled to a single tributary card via a working cross-connect card and a protection cross-connect card, multiple trunk cards can be interconnected with multiple tributary cards using the architectures and techniques described herein. The example of FIG. 8 describes data flow from tributary card 800 to trunk card 860; however, data flow from trunk card 860 to tributary card 800 is accomplished in the reverse manner.

Data is received from a tributary source (not shown in FIG. 8) by tributary interface 805 on tributary card 800. In one embodiment, tributary interface 805 provides a parallel interface to the tributary source. The data is optical data and can be received from any appropriate optical source. Tributary interface 805 can provide an interface with the source in any manner known in the art. Tributary interface 805 converts optical data to electrical data and sends the electrical data to HISSA 810.

HISSA 810 converts the parallel data received from tributary interface 805 to one or more streams of serial data. In one embodiment, HISSA 810 has four groups, or channels, that can transmit or receive serial data; however, any number of groups can be provided. In one embodiment one group from HISSA 810 is coupled to working cross-connect (XC-W) 820 and a second group from HISSA 810 is coupled to protection cross-connect (XC-P) 840. The same data is sent to both cross-connects in the same manner. This redundancy provides a more robust TMO; however, a working system can be provided without redundant cross-connects.

On XC-W 820, HISSA 825 is coupled to receive serial data from HISSA 810 via backplane 890. HISSA 825 converts the serial data to parallel data and sends the data to TISSA 830. TISSA 830 receives the data from HISSA 825 and switches the data to a desired format. For example, TISSA 830 can combine three OC-1 signals from three tributary cards into a single OC-3 signal that is provided to a trunk card. Other time and space switching can be provided by TISSA 830. TISSA functionality is described in greater detail below.

TISSA 830 provides parallel output data in the converted format to HISSA 835, which converts the parallel data to serial data and sends the data, over the backplane 890, to HISSA 865 on trunk card 860. HISSA 865 converts the serial data to parallel data and sends the parallel data to trunk interface 870. Trunk interface 870 converts the electrical data to optical data and provides the optical signal to a trunk line/device (not shown in FIG. 8).

XC-P 840 operates in a similar manner as XC-W 820. HISSA 845 receives serial data from HISSA 810 over the backplane 890. HISSA 845 converts the serial data to parallel data and provides the parallel data to TISSA 850. TISSA 850 receives the parallel data from HISSA 845 and performs the appropriate time/space switching functions on the data to generate a parallel output signal. HISSA 855 receives the parallel output signal from TISSA 850 and converts the parallel signal to a serial signal. HISSA 855 sends the serial signal to HISSA 865 on trunk card 860 over the backplane 890.

High Speed Serializer Architecture

A HISSA is a device that provides high speed data signals that can be communicated over a switching system backplane. In one embodiment, a HISSA provides communications channels that are utilized for transport of STS frames between tributary/trunk cards and a cross-connect card within the switching system.

The HISSA provides the communications channels through use of a high speed serial transmission technology. In one embodiment, each serial channel is rated at 622 Mbps (STS-12 line rate); however, other communications rates can also be provided. In one embodiment, each HISSA provides 16 serial channels (four per group); however, a different number of channels can be provided. Thus, when used on a tributary card, each HISSA can accept up to four STS-1/STS-3/STS-12 or one STS-48 input and utilize four serial link cores (or groups) to provide sufficient bandwidth for transmission of a STS-48 signal over the switching system backplane.

When used on a cross-connect card, each HISSA chip utilizes up to 16 serial links to receive data at the STS-48 signal rate. The HISSAs on the cross-connect card convert the serial signals to parallel output signals, for example, up to four STS-1/STS-3/STS-12 or one STS-48 signal for the cross-connect card to operate on. Multiple HISSAs can be used to support signal rates greater than STS-48. For example, four HISSAs can be used to support OC-192 fiber cards.

In one embodiment, a HISSA chip has two sets of pins (I/O buffers) that can be used to interface to STS-1/STS-3/

STS-12 and STS-48 line rate signals. Low rate STS (LRSTS) ports can be used to interface to 8-bit buses switching at 6.48/19.44/77.76 MHz for STS-1/STS-3/STS-12, respectively. High rate STS (HRSTS) ports can be used to interface with STS-48 line rate signals. In one embodiment, there are four HRSTS ports, each 16 bits wide switching at 155.52 MHz and four LRSTS ports, each 8 bits wide. Each of the LRSTS ports can support any one of STS-1, STS-3 or STS-12 line rates.

In one embodiment, there are three operating modes for a HISSA chip: 1) line/trunk card mode; 2) cross-connect mode; and 3) virtual tributary (VT) cross-connect interface mode. A brief description of each follows. In one embodiment of line/trunk card mode, the LRSTS ports are used to communicate with up to four devices. Each port is independently configurable for STS-1, STS-3 or STS-12. The transmit/receive clocks on each 8-bit port switch at 6.48 MHz, 19.44 MHz, or 77.76 MHz for STS-1, STS-3 or STS-12, respectively. HRSTS ports are not used in this mode. In this mode, four serial links are used, each transmitting and receiving a STS-12 line rate signal. If a particular LRSTS port is configured for STS-1 or STS-3, the chip internally provided padding with dummy overhead and payload stuffing such that the signal transmitted/received over each serial link is at the STS-12 line rate. This padding is described in greater detail below. In alternate embodiments, other line rates, a different number of ports, and/or different switching speeds can be provided.

In one embodiment of cross-connect mode, the HISSA uses the HRSTS ports. Each HRSTS port is 16 bits wide and switches at 155.52 MHz to provide a STS-48 line speed signal. A total of 16 serial links are available in this mode, four for each of the four possible STS-48 signals per HISSA chip. In alternate embodiments, other line rates, different number of ports and/or different switching speeds can be provided.

In one embodiment of VT cross-connect interface mode, the HISSA chip provides the means for the TISSA cross-connect chip to interface to the VT cross-connect. Both the HRSTS ports and the LRSTS ports are used in this mode. The serial links are not used in this mode. All four of the LRSTS ports can be use in this mode to interface to the VT cross-connect the data from each of these ports goes through an internal datapath and is then interfaced to a 16-bit HRSTS port. The signal from the HRSTS is at the STS-48 line rate. However, the signal may be transformed to four different STS-3 signals on the LRSTS side by the HISSA chip because the signal for VT cross-connection is assumed to only have a bandwidth of STS-12. In alternate embodiments, other line rates, a different number of ports and/or different switching speeds can be provided.

In one embodiment, the HISSA aligns incoming frames with a Master Sync signal to eliminate skew. In one embodiment, the HISSA can also perform scrambling, B1 byte generation and check only on the backplane side. No B1 generation and checks are performed on the HRSTS and LRSTS line ports. Loss of signal (LOS), alarm indication signals (AIS) and loss of frame (LOF) checks are also performed on the backplane side only.

In one embodiment, HISSAs internally derive a 77.76 MHz system clock from an externally supplied 155.52 MHz clock; however, other clock speeds can also be used. In an alternate embodiment, a HISSA can operate on a 77.76 MHz external clock signal. In one embodiment, the interfaces to the serial links operate on a 4-bit bus switching at 155.52 MHz. The input STS ports have FIFO queues with write pointers controlled by the receive clocks (6.48/19.44/155.52 MHz) and the read pointers are controlled by the system clock. The FIFO queues assist in reducing, or eliminating, skew in the incoming frames with respect to the Master Sync signal.

In one embodiment, HISSAs have the ability to select between a main and a standby set of system clocks and Master Sync sources. The HISSA chips also provide the ability to derive a master sync signal from one of the 16 serial link receivers. This provides the ability to reliably transmit a high speed master sync signal from the cross-connect card to each of the line cards without requiring dedicated traces in the backplane.

Figure 9A:
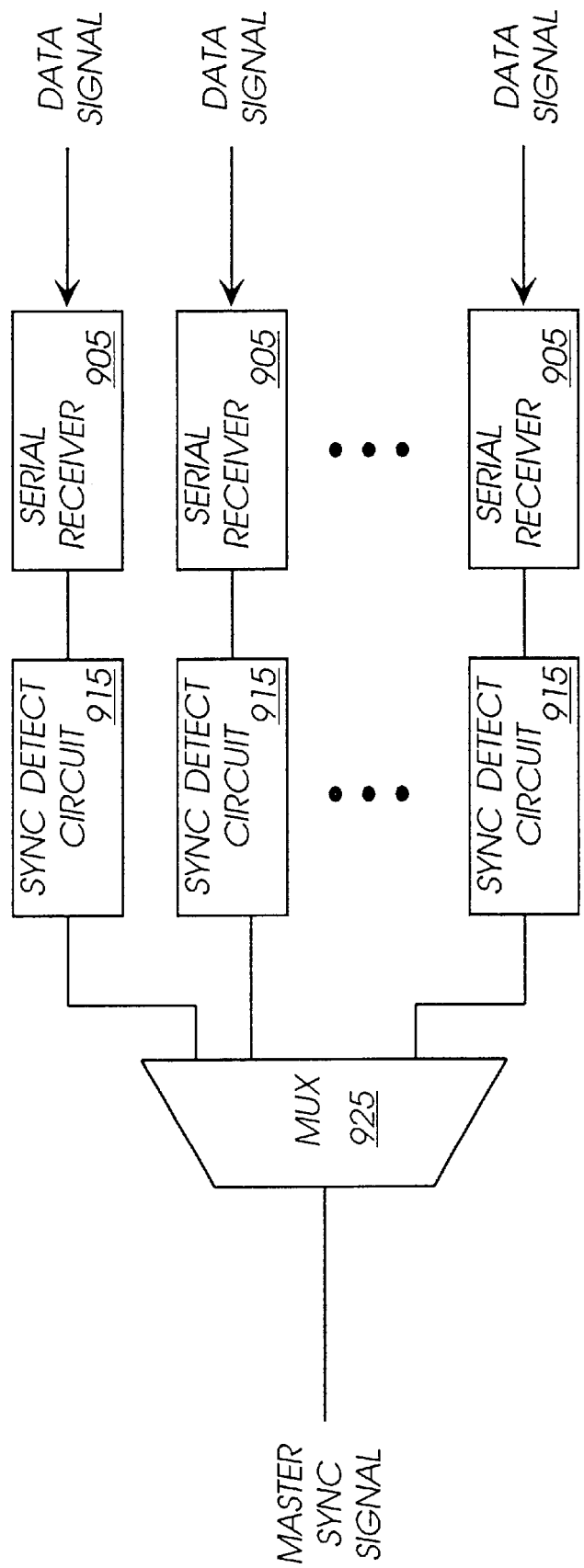
FIG. 9a shows a conceptual illustration of a selection of a Master Sync signal from a set of potential Master Sync signals.

FIG. 9a shows a conceptual illustration of a selection of a Master Sync signal from a set of potential Master Sync signals. The embodiment of FIG. 9a is described in terms of 16 potential Master Sync signals; however, any number of potential Master Sync signals can be provided.

Each of serial receivers 905 receives a serial data signal. In one embodiment, the serial data signals are received at a rate of 622 Mbits/sec; however, other data rates can also be supported. Each serial receiver has an associated sync detect circuit 915 that detects the beginning of a frame of data in the stream of data represented by the data signals received by the serial receivers.

Assuming 16 data signals are received, there are 16 start frames, one for each of the sync detect circuits. These 16 signals are input to multiplexer 925, which selects one of the 16 signals. The selected signal is used to derive the Master Sync signal. The embodiment of FIG. 9a provides an alternative to physically transmitting the Master Sync signal across the backplane. In other words, the embodiment of FIG. 9a eliminates the need to physically transmit the Master Sync signal across the backplane to multiple components.

FIG. 9b is a block diagram of one embodiment of a HISSA. For reasons of simplicity, only the 16-bit HRSTS ports are shown in FIG. 9. LRSTS ports are implemented in a similar manner. HISSA 900 as illustrated in FIG. 9 includes four groups (Group 0, Group 1, Group 2 and Group 3); however, a HISSA can have any number of groups. In general, each group includes a parallel/serial conversion circuit (910, 930, 950 and 970), a transmitter (915, 935, 955 and 975), and a receiver (920, 940, 960 and 980). HISSA 900 also includes control interface 990.

In one embodiment, each HRSTS group receives a 16-bit parallel electrical signal from an interface device (e.g., tributary interface 605, trunk interface 660) or from a TMO backplane (not shown in FIG. 9). In alternate embodiments, the parallel signal can have a different bit width, for example, 8 bits, 32 bits, 64 bits or 128 bits. The parallel/serial conversion circuit can convert parallel electrical signals to one or more serial electrical signals and can convert one or more serial electrical signals to a parallel electrical signal. Parallel/serial conversion can be accomplished in any manner known in the art.

In one embodiment, each group includes a transmitter circuit that can transmit up to four serial signals. In alternate embodiments, a transmitter circuit that can transmit a different number of serial signals can be provided. In one embodiment, each group also includes a receiver circuit that can receive up to four serial signals. In alternate embodiments, a receiver circuit that receive a different number of serial signals can be provided.

In one embodiment, the number of serial signals used to transmit a corresponding parallel signal is determined by the bandwidth of the backplane. For example, if the backplane can support transmission of data at a rate of 622 Mbps, any parallel signal that provides data at a lower bit rate can be transmitted by a single serial signal. Signals that provide data at a higher bit rate are supported by multiple serial signals.

In one embodiment, a parallel signal received by a first group (e.g., group 0) can be transmitted by the transmitter of that group as well as a second group (e.g., group 1). This provides support for redundant cross-connects. Multiple groups can also be used to receive redundant data.

Data is received in the opposite manner as described above for transmission. Serial data is received by one or more lines by a group receiver. The data is converted from serial to parallel by a parallel/serial conversion circuit (e.g., 910, 930, 950, 970). The parallel data is output via a parallel I/O port.

Time/Space Switching Architecture

As described in greater detail below, the time/space switching architecture accomplishes space switching with an array of multiplexers and time switching with a combination of counters and comparators. Both the multiplexers and the combination of counters and comparators are controlled by programmable registers. The programmability of the registers allows switching between different data formats. This combination provides cross-connect functionality at a significantly high speed. In one embodiment, cross-connect functionality can be provided at 155.5 MHz as specified by SONET specifications.

In one embodiment, a TISSA provides non-blocking time and space switching of SONET frames. In one embodiment, a TISSA has 16 input ports, each of which can receive STS-48 frames. A TISSA can also receive two STS-192 frames utilizing four ports per STS-192 frame. The received STS frames are cross-switched to eleven output ports. Up to 11 output ports can output STS-48 data, or two STS-192 frames can be output utilizing four ports per STS-192 frame. The switching configuration is stored in register arrays that are programmed by a microcontroller or in another manner. In alternate embodiments, the microcontroller can be external to the TISSA, or the microcontroller can be part of the TISSA.

In one embodiment, a TISSA provides the capability to extract any byte from incoming frames and manipulate any desired byte of the outgoing frames. Thus, a TISSA can switch data formats between the input and output ports. The TISSA architecture described herein is a 16×11 device. A larger time/space switch matrix can be constructed by cascading two or more TISSAs. For example, matrix sizes of 16×16, 16×22 and 21×22 can be achieved by using two and four TISSAs.

In one embodiment, a TISSA can align incoming frames with a master synchronization signal to eliminate skew in the data. In one embodiment, a TISSA can remove a skew of up to ±5 clock cycles in the incoming frames. In one embodiment, a TISSA can modify the H1 byte of an outgoing frame when the corresponding path is equipped with a New Data Flag.

In one embodiment, a TISSA is synchronized with a single 155.52 MHz clock signal and is configured and controlled by a MPC8260 microcontroller available from Motorola, Inc. of Schaumburg, Ill. A TISSA can also support a clock speed of 66 MHz for the microcontroller interface. Other clock speeds and other microcontrollers can also be used.

Figure 10:
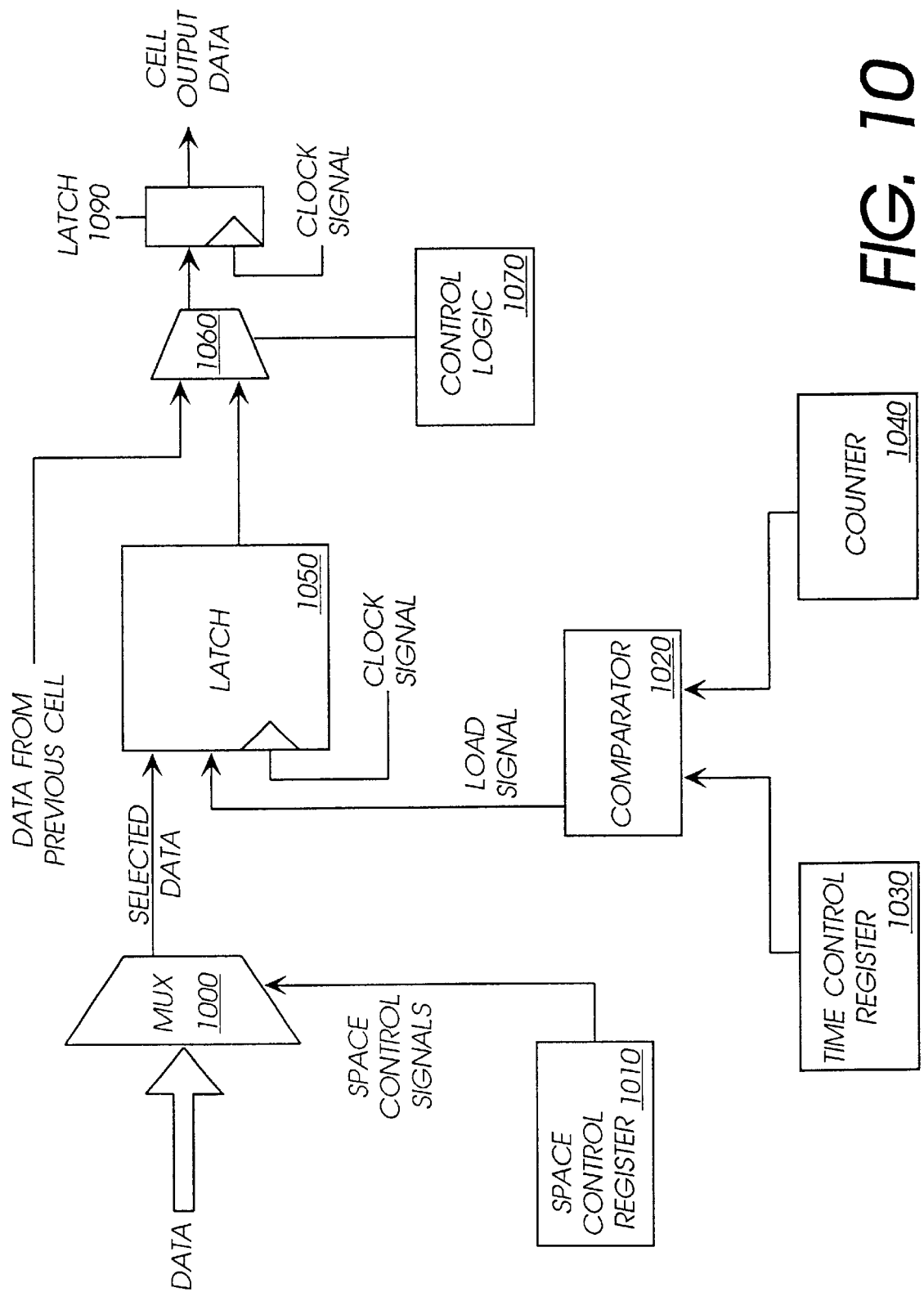
FIG. 10 illustrates one embodiment of a cell for use in a time and space switching ASIC (TISSA).

FIG. 10 illustrates one embodiment of a cell for use in a TISSA. As described in greater detail below, a TISSA is built of multiple cells interconnected by buses and other circuitry. Each cell can be programmed to select a particular stream of bits from multiple parallel bit streams and to select a particular bit from the selected bit stream. Arrays of cells can be used to programmably select bytes of data and convert between signal formats at line speed data rates.

Multiplexer 1000 receives a parallel electrical signal from a bus (not shown in FIG. 10). In one embodiment, multiplexer 1000 is a 32:1 multiplexer; however, other multiplexer widths can be used based on, for example, the type and format of data to be received and converted. One embodiment of a multiplexer architecture that can be used is described in greater detail below with respect to FIG. 9.

Space control register 1010 provides select lines, labeled "Space Control Signals" to multiplexer 1000. The value stored in space control register 1010 determines the input line to multiplexer 1000 that is passed. Multiplexing can be accomplished by any manner known in the art. The data stream that is passed by multiplexer 1000 is labeled "Selected Data." The Selected Data is provided to latch 1050. Latch 1050 operates to latch selected bits from the Selected Data stream in response to the Load Signal.

Time control register 1030 is a programmable register that is used to select bits from the Selected Data stream. Counter 1040 is a counter that counts bit slots in the Selected Data stream. Counter 1040 is reset by a timer or other circuitry (not shown in FIG. 10) that is synchronized with the incoming data streams. For example, the beginning of each SONET frame can generate a control signal that is used to reset the counter. Bits are then selected based on an offset from the beginning of the frame.

Comparator 1020 receives signals from time control register 1030 and counter 1040. When the value provided by time control register 1030 is equal to the value provided by counter 1040, comparator 1020 asserts the "Load Signal" that causes latch 1050 to latch the bit value provided by the Selected Data stream. Latch 1050 also receives a clock signal from a clock signal generation circuit (not shown in FIG. 10). The clock signal can be generated in any manner known in the art.

The signal output by latch 1050 representing the selected bit is output is input to multiplexer 1060. In one embodiment, multiplexer 1060 also receives a signal output by a previous cell, if the current cell is not the first cell in the array of cells. Control logic 1070 provides a select signal to multiplexer 1060. Multiplexer 1060 passes the data received from the previous cell except when latch 1050 provides data from the Selected Data stream. Thus, cascaded cells can reformat the input data and latch the input data via latch 1090 prior to passing the input data to the subsequent cell.

In one embodiment control logic 1070 is coupled to space control register 1010 and time control register 1030 to determine when the data provided by the latch is the desired data. Latch 1090 outputs a value that is provided to a subsequent cell in the array of cells. Space control register 1010 and time control register 1030 are illustrated as separate registers; however, space control register 1010 and time control register 1030 can be two fields in a single physical register. In one embodiment space control register 1010 and time control register 1030 is programmed by a microcontroller that is external to the TISSA chip; however, space control register 1010 and time control register 1030 can be programmed in another manner.

Figure 11:
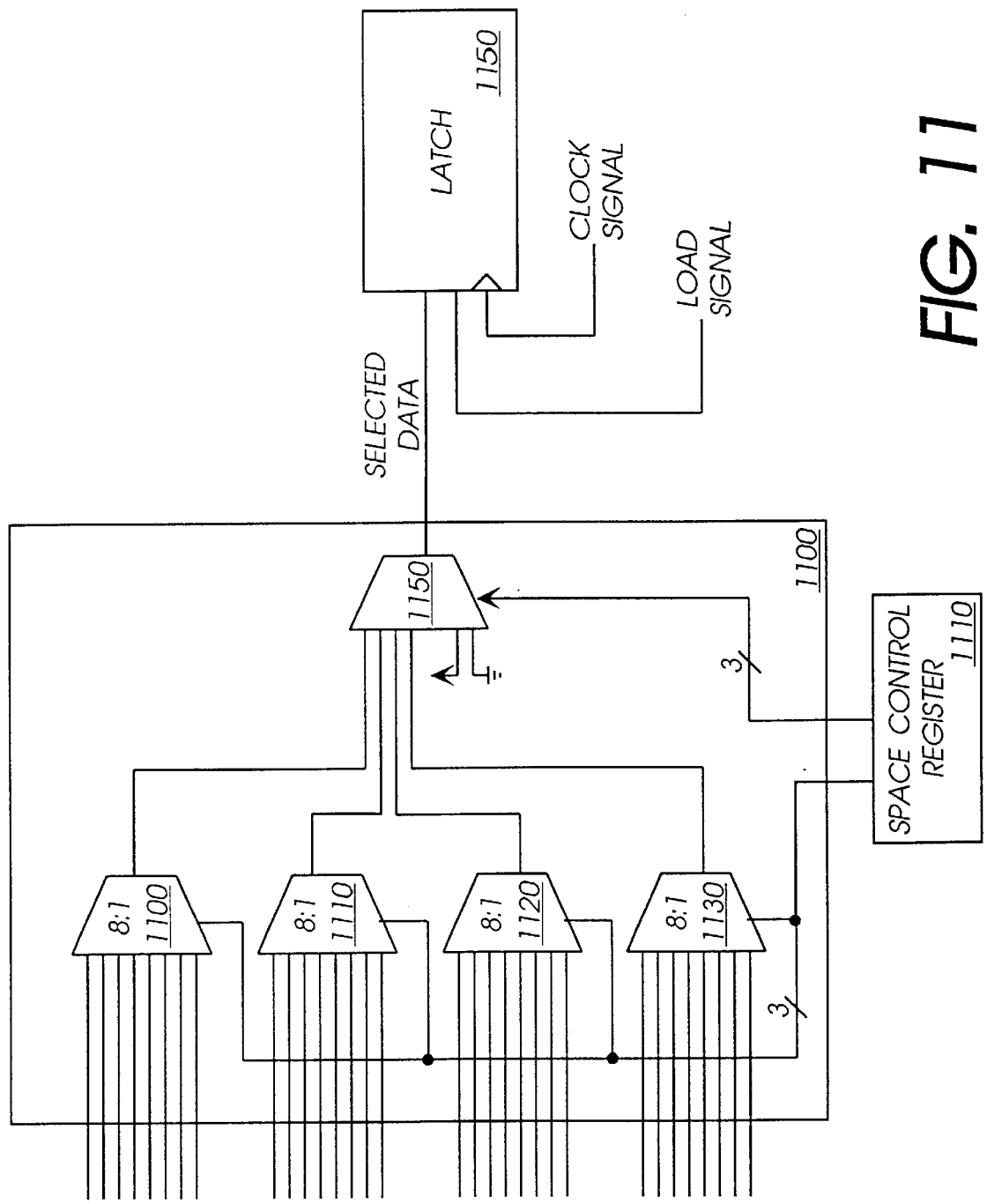
FIG. 11 illustrates one embodiment of a multiplexer architecture for use in a TISSA cell.

FIG. 11 illustrates one embodiment of a multiplexer architecture for use in a TISSA cell. The example of FIG. 11 assumes a 32-bit input signal, however, a different multiplexer configuration can be used to support a different bit sized input signal. The example of FIG. 11 also provides support for alarm (AIS) signals.

In one embodiment, multiplexer 1000 includes four 8:1 multiplexers (1100, 1110, 1120 and 1130) and one 6:1 multiplexer 1150. Space control register 1010 provides a three-bit control signal to each of multiplexers 1100, 1110, 1120 and 1130. The control signal to the 8:1 multiplexers causes each of the 8:1 multiplexers to pass one of the eight signals received. The signals output by the 8:1 multiplexers are input to multiplexer 1150, which also receives as inputs a logical high signal and a logical low signal.

Space control register 1010 also provides a three-bit control signal to multiplexer 1150. Multiplexer 1150 selects between the four signals provided by multiplexers 1100, 1110, 1120 and 1130 and the logical high and low signals. The signal output by multiplexer 1150 is the Selected Data signal described above. The logical high and low signals allow alarm or other signals to be generated by a TISSA.

Figure 12:
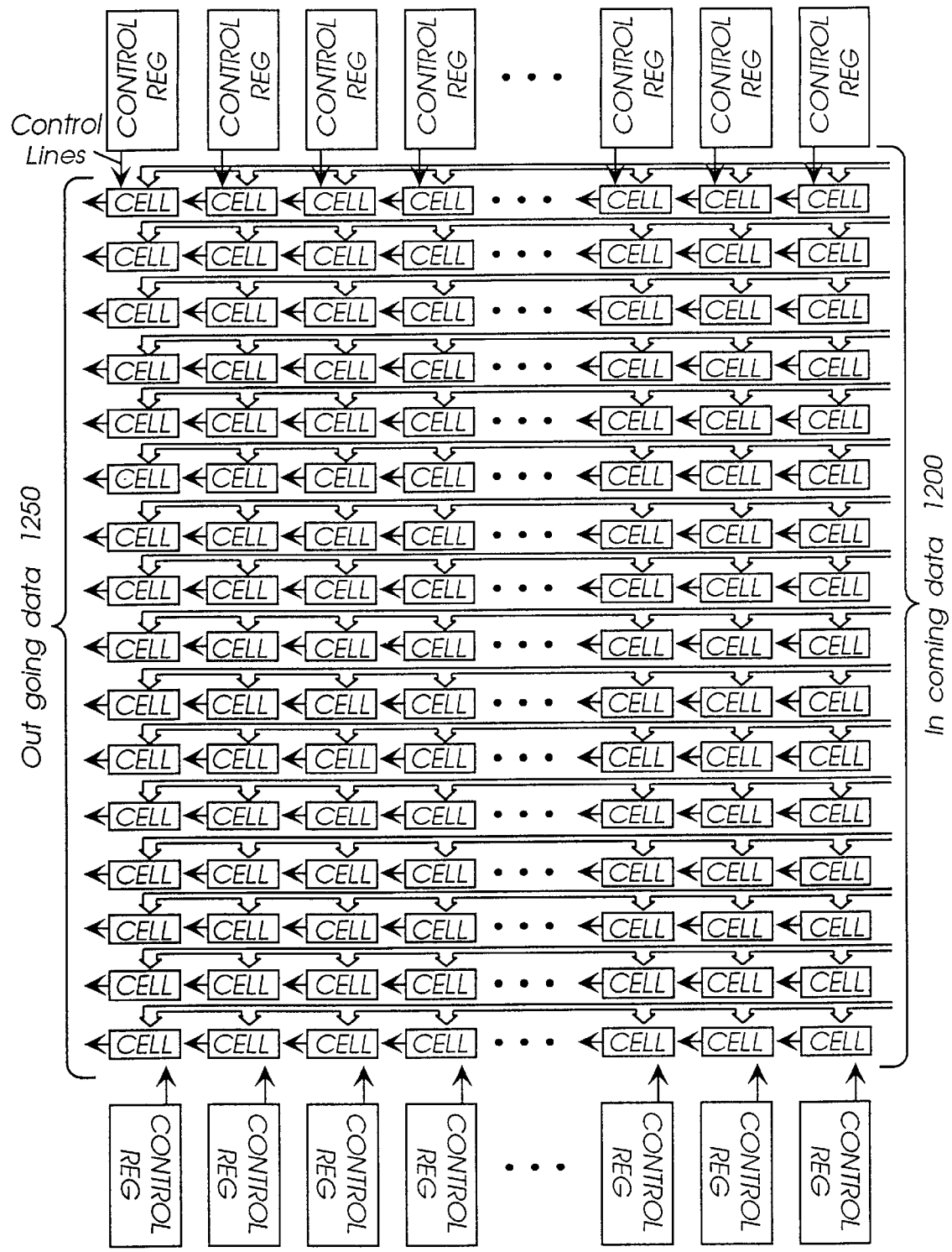
FIG. 12 is a logical diagram of a layout of cells to provide TISSA functionality for a single port.

FIG. 12 is a logical diagram of a layout of cells to provide TISSA functionality for a single port. In one embodiment, each cell in FIG. 12 includes the circuitry described above with respect to FIGS. 10 and 11. The exception to the cell layouts is the first column of cells that do not include data coming from a previous cell. For one embodiment, the input to these cells the tied to ground or a logical "zero" signal.

In one embodiment, each port has 16 incoming data lines and 48 control registers, 24 along the top of the array of cells and 24 along the bottom of the array of cells. In one embodiment, the control registers along the top of the array provide the same values as the corresponding control registers along the bottom of the array. To provide a single 16-bit port, a 16×24 array of cells is provided. The control registers of FIG. 12 include both the space control registers and the time control registers described above. Each cell receives each of the 16 input port lines and control lines from one of the control registers.

TISSA Floor Plan

Figure 13:
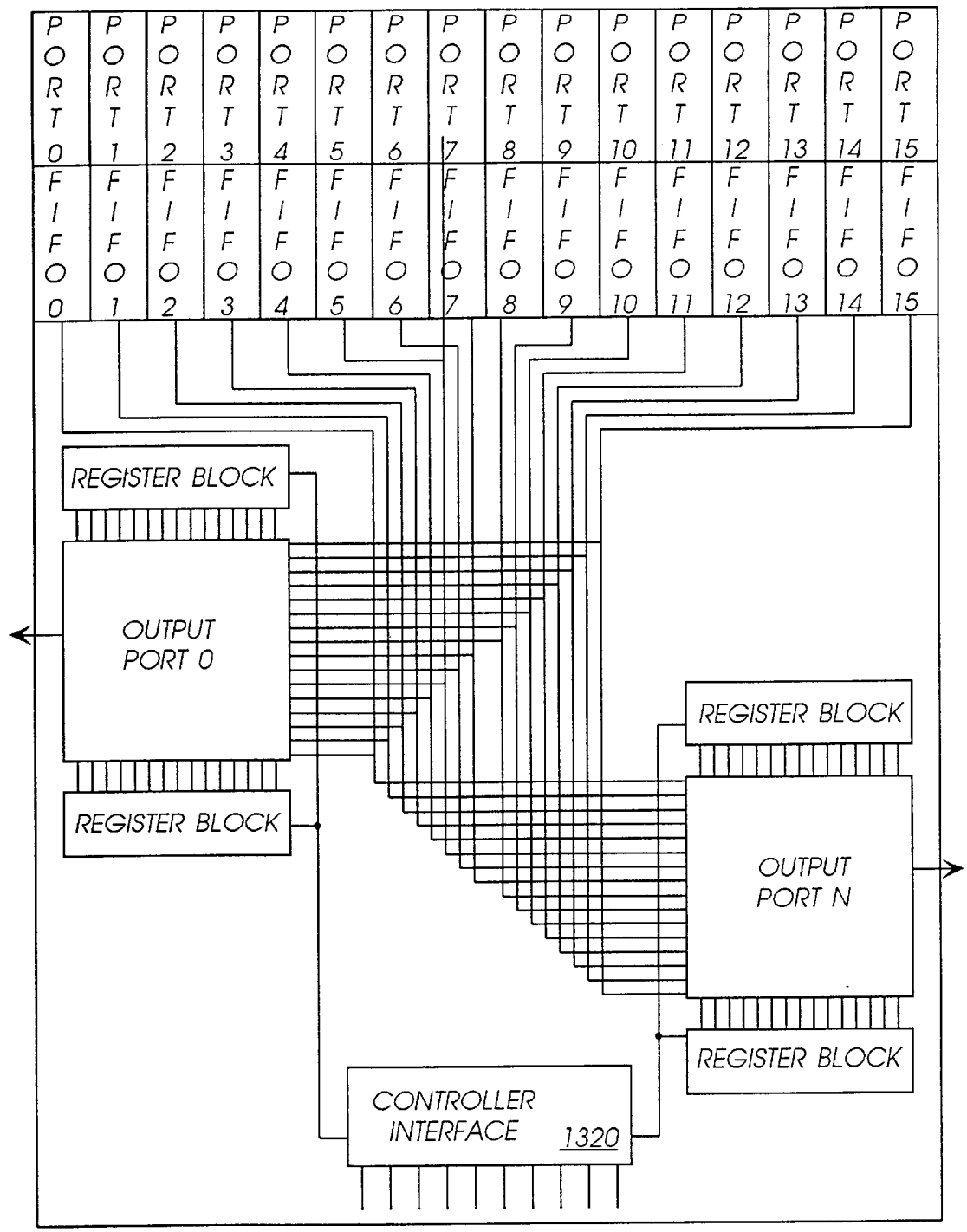
FIG. 13 illustrates one embodiment of a layout of a TISSA.

FIG. 13 illustrates one embodiment of a basic layout, or floor plan, of a TISSA. Because there are a large number of cells that are highly interconnected, without a proper floor plan, it is difficult to route the interconnecting metal wires. In one embodiment, floor planning is accomplished in two stages. The switching cells are placed to form a port then the ports are placed to form a switch. One of the peculiarities of the floor plan is that the switching cells are tiled in such a manner that incoming data lines and cross-connected out going data lines do not cross.

In the embodiment and orientation illustrated in FIG. 13, incoming data enters from the top and flows toward the bottom. Out going data is shifted from left to right, or right to left depending on the orientation of the port. This floor plan also defines the location of the control registers. Because there are a significant number of control lines from the control registers, placement of the registers impacts overall routing.

The floor plan illustrated in FIG. 13 provides an efficient layout that allows data signals to be time/space switched. FIG. 13 depicts data flow through the cells that performs the cross-connect functionality and control lines from the control registers. The array of cells and control registers forms a port.

In one embodiment, 16 input ports (labeled $Port_0$ through $Port_{15}$) are provided; however, any number of input ports can be provided. Each port has an associated queue ($FIFO_0$ through $FIFO_{15}$) that buffers input data. The queues remove data skew among the 16 input ports. Controller interface 1320 can be any microcontroller. In one embodiment, controller interface 1320 is an industry standard microcontroller core that is included as part of the integrated circuit layout of the TISSA. In alternate embodiments, other types of controllers, for example, custom designed controller can be used.

Controller interface 1320 outputs data to the control registers (space and time) associated with the respective cells. In FIG. 13, the control registers are illustrated as register blocks for reasons of simplicity. Controller interface 1320 causes values to be written into the various control registers to convert the input data stream into a desired output data stream. The input data streams are provided to the output ports (e.g., output $port_0$ through output $port_n$). The cells within the output ports latch and forward the specific bits that the cells are programmed to select.

System Clock Failure Detection

Figure 14:
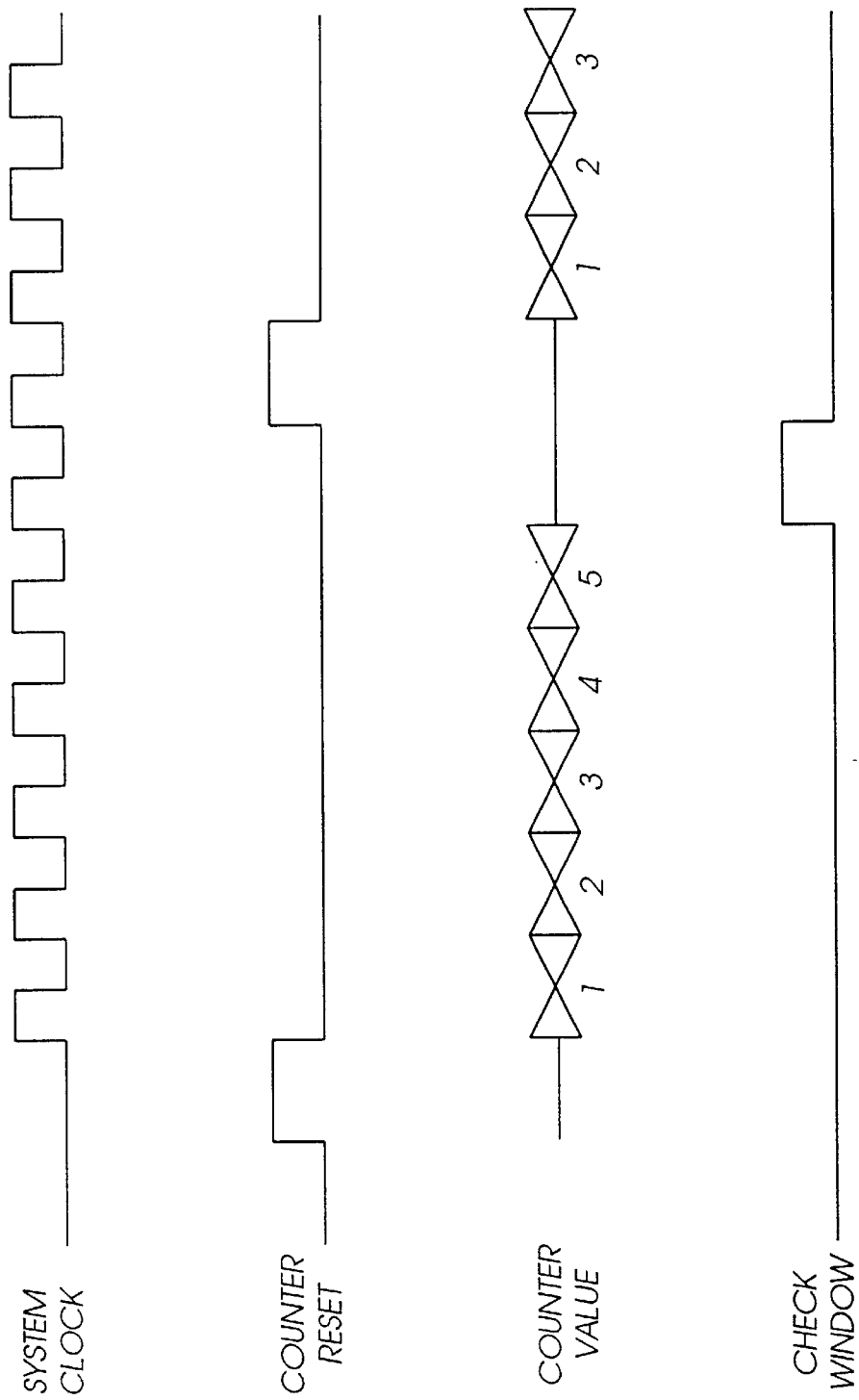
FIG. 14 illustrates a timing diagram associated with one embodiment of detection of a system clock failure.

FIG. 14 illustrates a timing diagram associated with one embodiment of detection of a system clock failure. In a TMO or other synchronous electronic systems, a system clock is provided to multiple integrated circuit chips. During normal operation, the system clock may fail for some reason. For example, a system clock generator circuit may be damaged or otherwise fail. Lines used for system clock signal distribution may be damaged or shorted.

In one embodiment, in order to detect a system clock failure system clock cycles are counted and, at predetermined intervals, checked to determine whether the expected number of system clock cycles have occurred. If not, an indication (e.g., an interrupt) is generated in response to the system clock failure.

Referring to FIG. 14, assertion of the Reset signal causes the a counter to reset. When the Reset signal is deasserted, the counter counts the number of System Clock Signal cycles. A predetermined period of time (e.g., five System Clock Signal cycles) after the Reset signal is deasserted, the Check Window signal is asserted. The Check Window signal causes a comparator to compare the Counter Value to a predetermined number (e.g., five) representing the expected number of System Clock Signal cycles to have occurred since deassertion of the Reset signal.

If the counter value is equal to the expected number of clock cycles, the system clock signal is considered active and valid, and no clock failure action is taken. If the counter value is not equal to the expected number of clock cycles, the system clock signal is considered failed. A system clock failure signal is generated.

Figure 15:
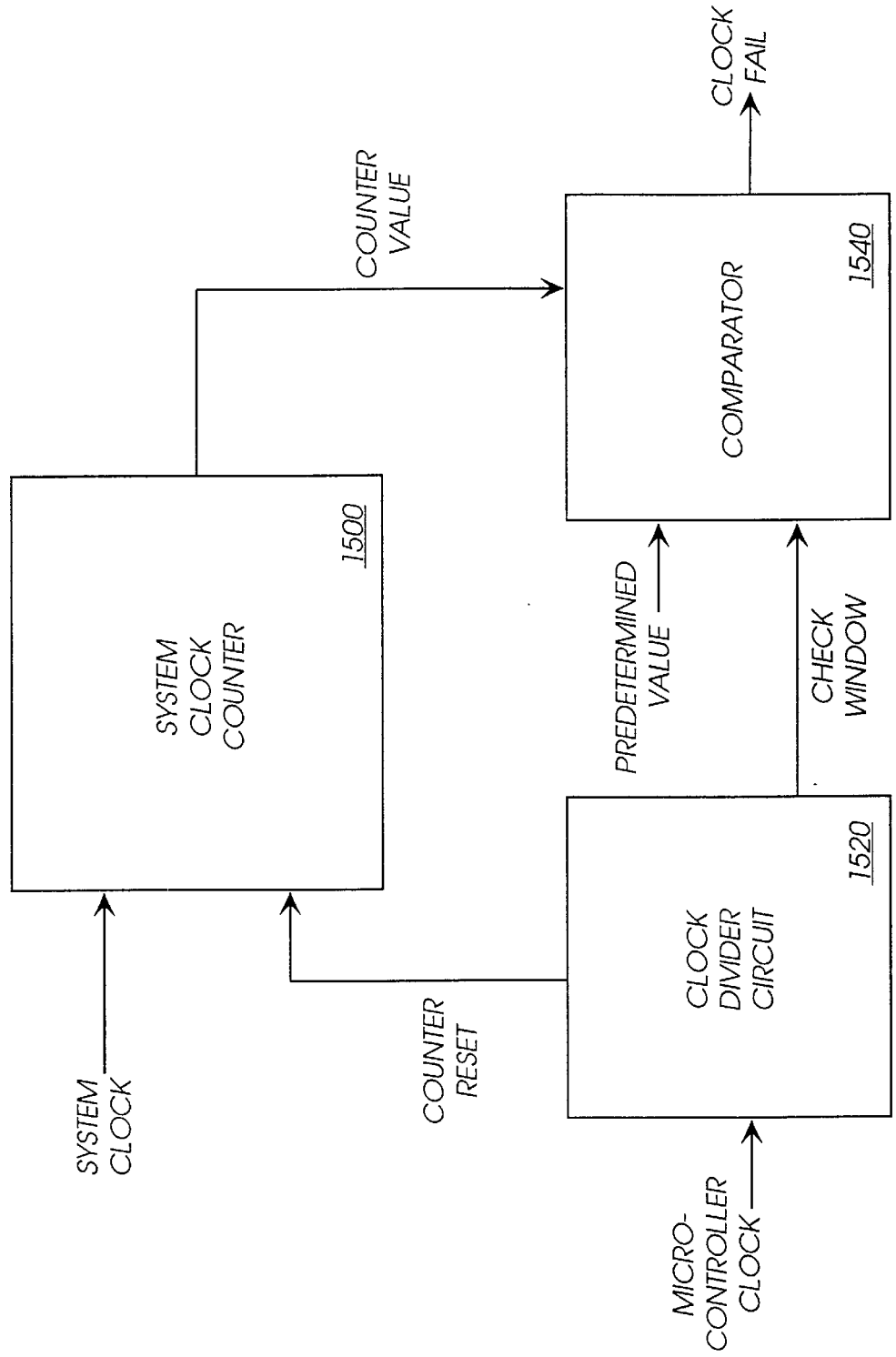
FIG. 15 illustrates one embodiment of circuitry for detection of a system clock failure.

FIG. 15 illustrates one embodiment of circuitry for detection of a system clock failure. The timing of the signals generated and used by the circuitry of FIG. 15 is that described above with respect to FIG. 12. In the event that the system clock fails, a clock failure signal is generated.

In one embodiment, the system clock failure circuitry includes free running counter 1500 that is incremented at every rising (or falling) edge of the SYSTEM CLOCK signal. Counter 1500 is periodically reset, for example, by a COUNTER RESET signal generated by clock divider circuit 1520, based on a MICROCONTROLLER CLOCK signal. During the free running of the SYSTEM CLOCK, counter 1500 is expected to reach a predetermined value.

During a predefined time window, the value of system clock counter 1500 is compared to the predetermined value by comparator 1540. In one embodiment, the time window is defined by the CHECK WINDOW signal, which is generated by clock divider circuit 1520. If the COUNTER VALUE matches the PREDETERMINED VALUE, the SYSTEM CLOCK signal is assumed to be running properly. Otherwise, if the SYSTEM CLOCK signal stops, counter 1500 stops incrementing and does not reach the predetermined value. If the COUNTER VALUE does not match the PREDETERMINED VALUE, comparator 1540 asserts the CLOCK FAIL signal. The CLOCK FAIL signal can be used, for example, to generate an interrupt, or to enable a backup system clock generator.

Jitter Protection

Figure 16:
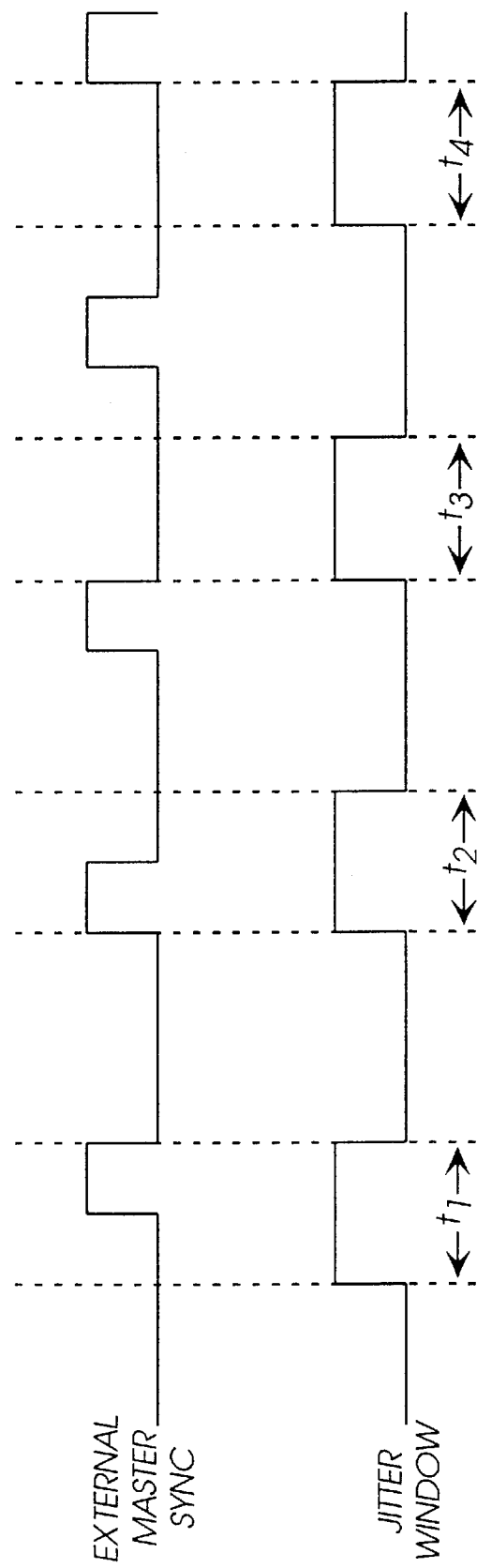
FIG. 16 illustrates a timing diagram for one embodiment of jitter protection.

FIG. 16 illustrates a timing diagram for one embodiment of jitter protection. In one embodiment a External Master Sync signal is provided to various components of a TMO (e.g., a TISSA) or other electronic device. The External Master Sync signal can be used for synchronization of multiple circuits that can be physically located on multiple integrated circuit chips.

For various reasons, the External Master Sync signal may not be received at regular intervals as the result of, for example, signal jitter. In order to provide the appropriate functionality, the components of a TMO are synchronized only to jitter-free External Master Sync signals. In one embodiment, a programmed number (e.g., three, five) of External Master Sync signal pulses (i.e., periods of time during which the External Master Sync signal is asserted) are used to calibrate expected times of arrival for subsequent External Master Sync signal pulses. For example, a system clock can be used to determine the time period between External Master Sync signal pulses.

A jitter window is determined based on the period of time between External Master Sync signal pulses. For example, if 100 system clock signal cycles occur between External Master Sync signal pulses, a jitter window of five system signal clock cycles, or five per cent, can be established. If the External Master Sync signal pulse is observed during the jitter window, the External Master Sync signal pulse is considered jitter free. Otherwise, the External Master Sync signal is considered to have some jitter and recalibration is started.

In one embodiment, if a predetermined number (e.g., three, six) of External Master Sync signal pulses are considered to have some jitter, the jitter window is reevaluated. For example, at times $t_1$ and $t_2$, the External Master Sync signal pulse is within the jitter window. These External Master Sync signal pulses are considered valid and used for synchronization/reset purposes. At times $t_3$ and $t_4$, the Reset signal pulse is outside the jitter window. These External Master Sync signal pulses are not used for synchronization/reset purposes.

Figure 17:
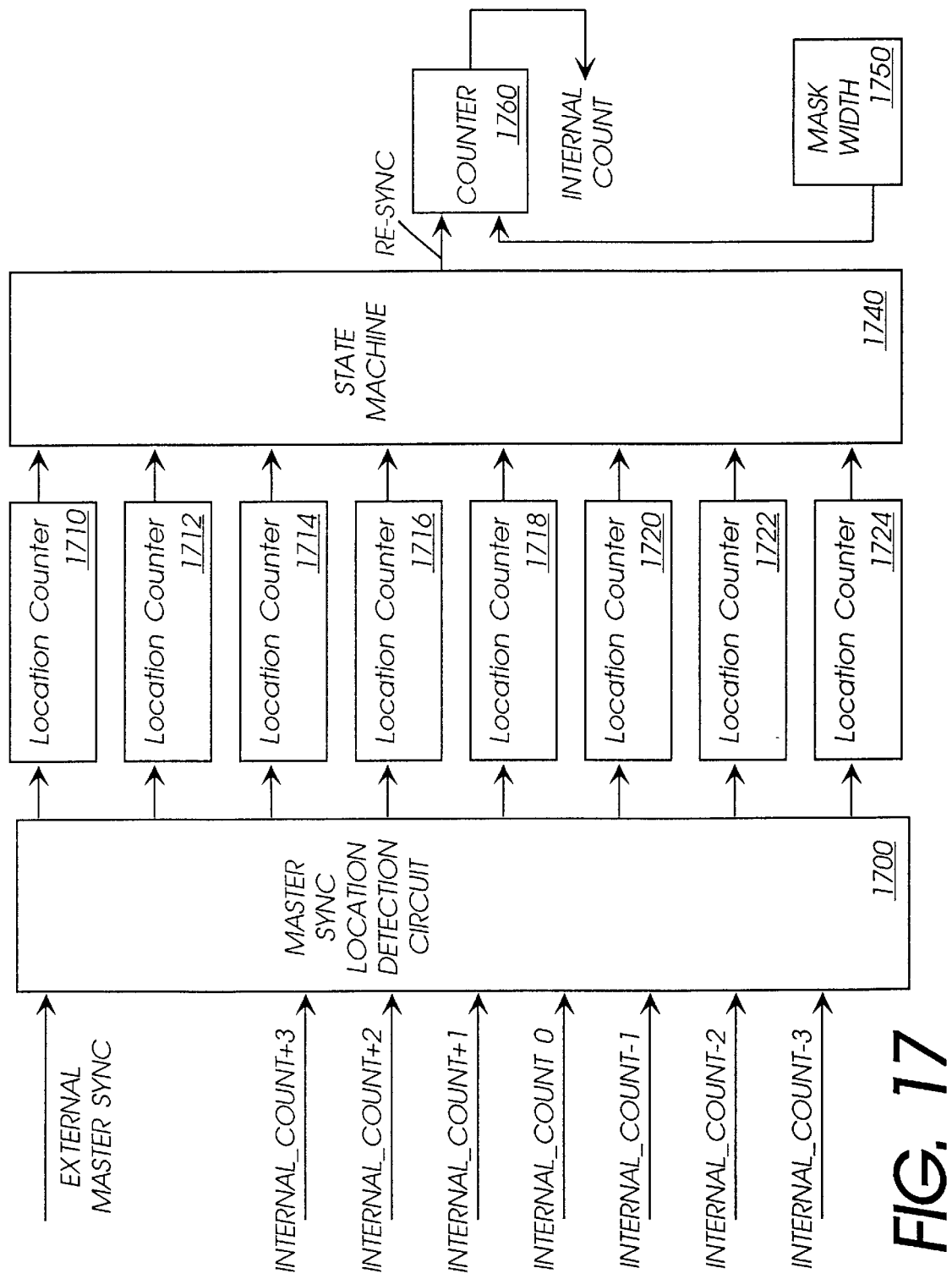
FIG. 17 illustrates one embodiment of circuitry for jitter protection.

FIG. 17 illustrates one embodiment of circuitry for jitter protection. A TISSA chip can operate either as a master device or as a slave device. When a TISSA operates as a master device, that TISSA's internal counter is not synchronized with an External Master Sync signal, instead the master device generates its own Master Sync signal, which is used by the other TISSAs in slave mode for synchronization purposes. When a TISSA operates as a slave device, that TISSA's internal counter is synchronized with the External Master Sync signal. However, during operation, the External Master Sync signal can jitter for a short duration of time and it is not desirable to resynchronize the counters of the slave TISSAs to the External Master Sync as a result of this spurious shift.

The circuit of FIG. 17 removes jitter in the External Master Sync signal. During the power on phase, one or more counters (e.g., location counters 1710, 1712, 1714, 1716, 1718, 1720, 1722 and 1724) are reset when a External Master Sync signal pulse is received.

If the External Master Sync pulses are received within the jitter windows for a predetermined number of times, the TISSA is considered stable. During the stable state, if the External Master Sync signal pulse shifts (plus or minus) within the jitter window, counter 1760 is not reset in response to the External Master Sync signal pulses. However, if the External Master Sync signal pulses consistently arrive outside the jitter window, as counted by the location counter, state machine 1740 goes into a correction state and resynchronizes counter 1760 with the shifted External Master Sync signal.

Master Sync Location detection circuit 1700 receives the External Master Sync signal and a set of signals that define the jitter window. In the example of FIG. 17, the signals that define the jitter window are INTERNAL_COUNT+3, INTERNAL_COUNT+2, INTERNAL_COUNT+1, INTERNAL_COUNT_0, INTERNAL_COUNT-1, INTERNAL_COUNT-2, and INTERNAL_COUNT-3. The number of signals that define the jitter window can be adjusted based on the size of the desired jitter window and/or the programmability of the jitter window.

The number of incidence of the External Master Sync signal is determined with respect to the value of counter 1760. In one embodiment, master sync location detection circuit 1700 compares the External Master Sync signal to the INTERNAL$_{13}$ COUNT signals. Depending upon the timing of pulses of the External Master Sync signal, the corresponding location counter is incremented. When a counter reaches programmed values, a signal is generated that is received by state machine 1740.

State machine 1740, depending upon signals received from other location counters, makes a state transition from the CORRECTION state to the STABLE state. Once in the STABLE state, state machine 1740 asserts the RE-SYNC signal. Comparator 1760 compares the RE-SYNC signal with the MASK WIDTH signal generated by mask width generator 1750. If the RE-SYNC signal assertion falls within the "width" of the MASK WIDTH signal, internal counter 1760 is not reset. Thus, any jitter in the External Master Sync does not effect the internal counter.

Bit Stuffing/Bit Destuffing

Figure 18:
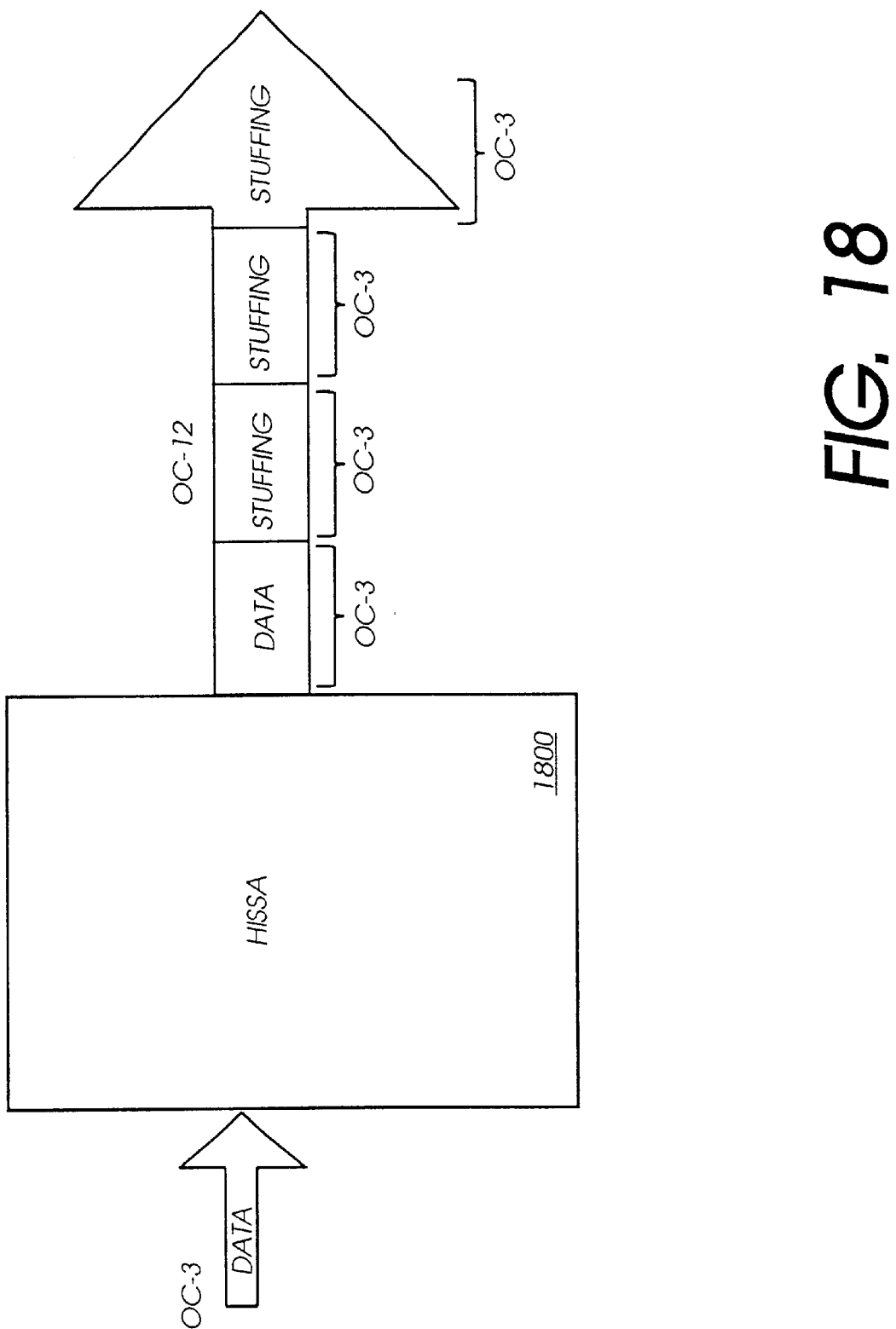
FIG. 18 is a conceptual illustration of one embodiment of bit stuffing.

FIG. 18 is a conceptual illustration of one embodiment of bit stuffing. HISSA 1800 receives a signal according to a SONET protocol. In the example of FIG. 18, the incoming signal is OC-3; however, the incoming data can be received at any data rate. Similarly, the output signal in the example of FIG. 18 is OC-12, but any outgoing data rate can be used.

In one embodiment, HISSA 1800 outputs data at a constant rate (e.g., OC-12). When incoming data is received at a lower rate (e.g., OC-3), the excess bandwidth is filled with "dummy" data. The dummy data can be any predetermined pattern. In one embodiment, the dummy data is a string of zeros. In alternate embodiments, other data patterns (e.g., 010101 . . . , 1111000011110000 . . .) can be used.

If, for example, HISSA 1800 receives four OC-3 data streams and outputs a single OC-12 data stream, the four input streams would be combined to generate the output stream without stuffing. As mentioned above, each group of a HISSA has four serial transmit lines. In the example of FIG. 18, one of the serial lines would transmit the OC-3 data and the other three serial lines would transmit the stuffing data.

A single transmit line can transmit both valid data and stuffing, if the input and output data rates require it. For example, if an input data stream is an OC-1 data stream and the output data stream is an OC-12 data stream, the first serial line would transmit one part valid data and two parts stuffing, and the remaining three serial lines would transmit stuffing.

Figure 19:
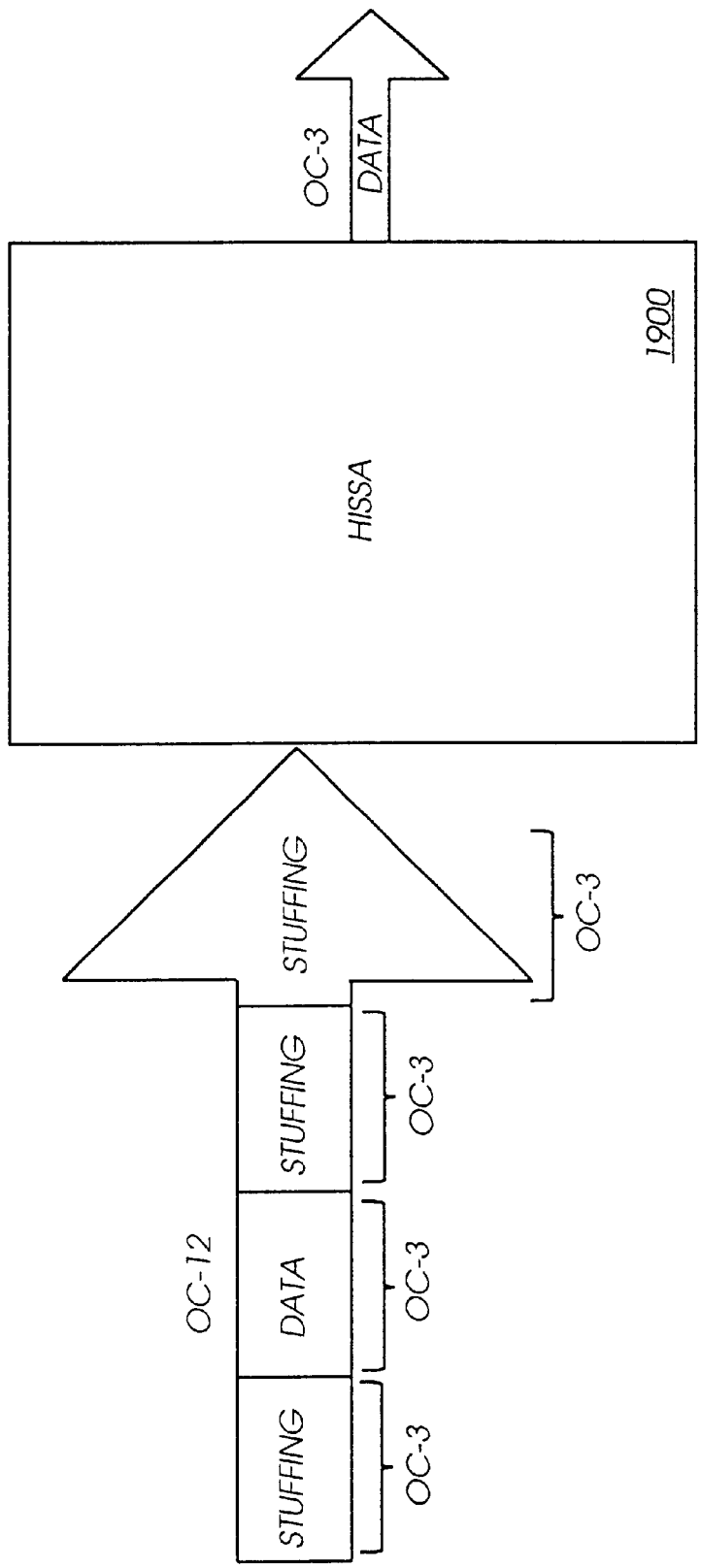
FIG. 19 is a conceptual illustration of one embodiment of bit destuffing.

FIG. 19 is a conceptual illustration of one embodiment of bit destuffing. HISSA 1900 performs the reverse process as HISSA 1800. HISSA 1900 receives a data stream at a predetermined data rate and strips off the stuffing data, or destuffs the data stream. HISSA 1900 outputs the valid data as a parallel signal.

Frame Alignment

The SONET specification defines "framing bytes" as a two-byte code (1111 0010 0010 1000), or F6 28 in hexadecimal that is used for frame alignment purposes. These bytes uniquely identify the start of each STS-1 frame and are not scrambled during the transmission process. lack of scrambling makes their detection easier. When multiple STS-N frames are sent in a higher rate STS-N frame, framing bytes must appear in every STS-1 of the composite signal. The framing bytes are part of the SOH described above with respect to FIG. 1b.

The SONET standard defines a hexadecimal sequence of F6 28 to indicate the beginning of a frame. The binary equivalent of F6 28 hexadecimal is 1111 0110 0010 0100. A circuit to detect the frame start sequence is required so that data is processed correctly. However, when SONET frames, or other data, are passed between integrated circuit chips, the various integrated circuit chips may not be synchronized as to the specific bit that begins a byte. If an integrated circuit is off by a single bit, that integrated circuit may not detect the beginning of a frame, which will result in incorrectly processed data.

Figure 20:
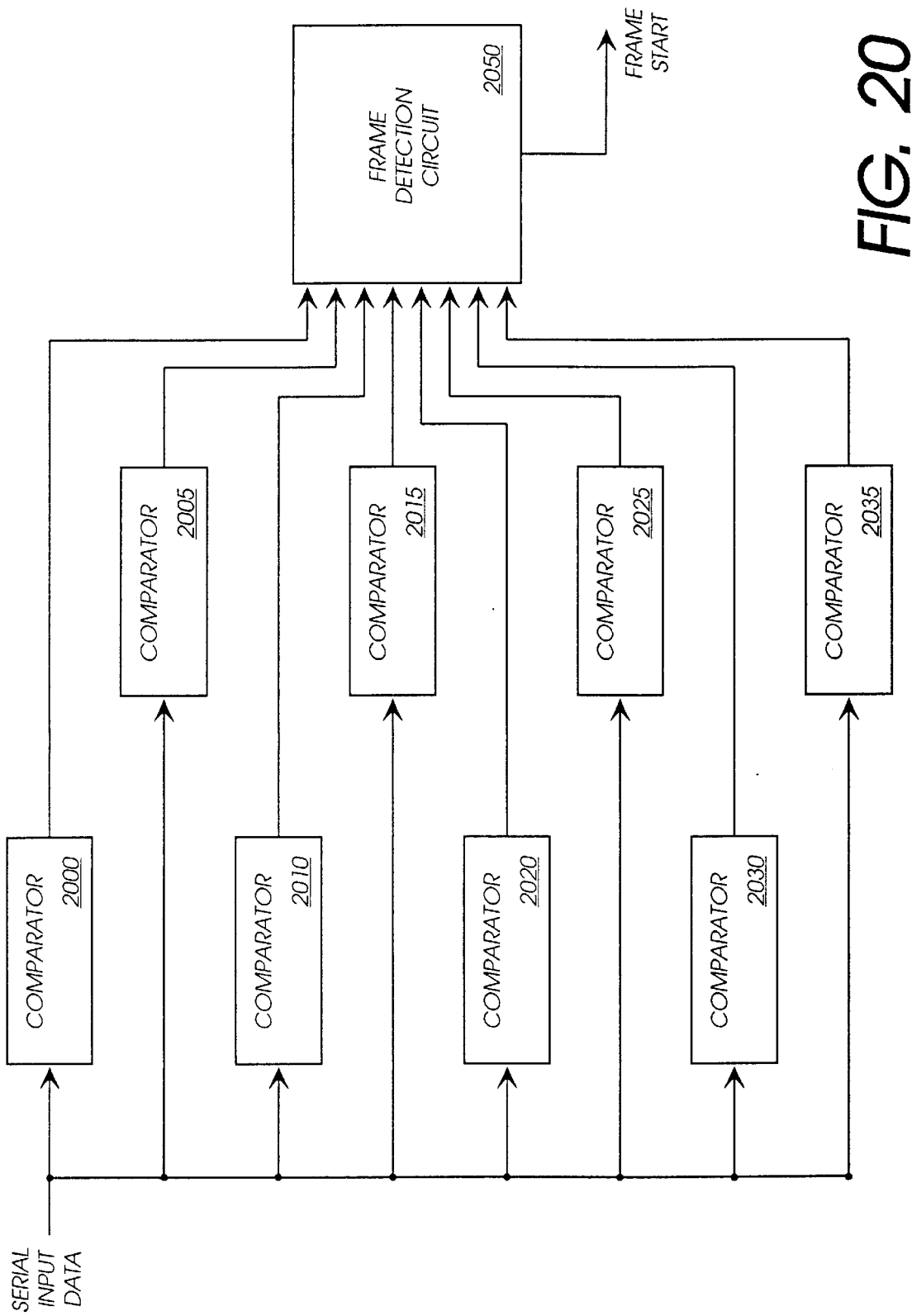
FIG. 20 illustrates one embodiment of circuitry for detecting a SONET frame threshold.

FIG. 20 illustrates one embodiment of circuitry for detecting a SONET frame threshold. In one embodiment, frame alignment is provided by HISSAs receiving serial data. The serial data can be received from another HISSA via the system backplane, or the serial data can be received in another manner.

In one embodiment, HISSAs have eight comparators that receive the serial data and compare sequences of bits in the serial data to the frame start sequence and to seven offset versions of the frame start sequence. Thus, any potential delay caused by transmission of the frame would be compensated for by the multiple versions of the frame start sequence. The offset frame start sequences are described as being logically rotated to the right; however, the frame start sequences can be logically rotated to the left to provide the same overall functionality.

In one embodiment, comparator 2000 compares the serial input data to the frame start sequence F6 28 hexadecimal (1111 0110 0010 1000 decimal). Comparison can be accomplished in any manner known in the art. The comparison values can be hard wired into comparator 2000 or can be provided by another circuit (not shown in FIG. 20).

Comparator 2005 compares the serial input data to the frame start sequence logically right rotated to the right by one bit. Thus, comparator 2005 compares the serial input data to 7B 14 hexadecimal (0111 1011 0001 0100 binary). As with comparator 2000, the comparison values can be hard wired into comparator 2005 or can be provided by another circuit (not shown in FIG. 20).

Comparator 2010 compares the serial input data to the frame start sequence logically rotated to the right by two bits. Thus, comparator 2010 compares the serial input data to 3D 8A hexadecimal (0011 1101 1000 1010 binary). Comparator 2015 compares the serial input data to the frame start sequence logically rotated to the right by three bits. Thus, comparator 2015 compares the serial input data to 1E C5 hexadecimal (0001 1110 1100 0101 binary).

Comparator 2020 compares the serial input data to the frame start sequence logically rotated to the right by four bits. Thus, comparator 2020 compares the serial input data to 8F 62 hexadecimal (1000 1111 0110 0010 binary). Comparator 2025 compares the serial input signal to the frame start sequence logically rotated to the right by five bits. Thus, comparator 2025 compares the serial input signal to 47 B1 hexadecimal (0100 0111 1011 0001 binary).

Comparator 2030 compares the serial input data to the frame start sequence logically rotated to the right by six bits. Thus, comparator 2030 compares the frame start sequence to A3 D8 hexadecimal (1010 0011 1101 1000 binary). Comparator 2035 compares the serial input data signal to the frame start sequence logically rotated by the right by seven bits. Thus, comparator 2035 compares the frame start sequence to 51 EC hexadecimal (0101 0001 1110 1100 binary).

The respective comparators assert a match signal when the serial input data stream includes a bit sequence that matches the values for the respective comparators. The output signals from the comparators is provided to frame detection circuit 2050. Frame detection circuit 2050 can determine the relationship between the beginning of a frame and an internal HISSA clock or HISSA processing by determining the comparator that detected the frame start sequence.

For example, if the incoming frame is synchronized with the HISSA, comparator 2000 would detect the frame start sequence. If the incoming frame lags the HISSA processing by two bits, or clock cycles, comparator 2010 would detect the frame start sequence. By determining the relationship between the HISSA processing and the incoming frame, frame detection circuit 2050 can cause processing of the incoming frame to be synchronized with the start of the incoming frame.

Cascaded Cross-Connects

Figure 21:
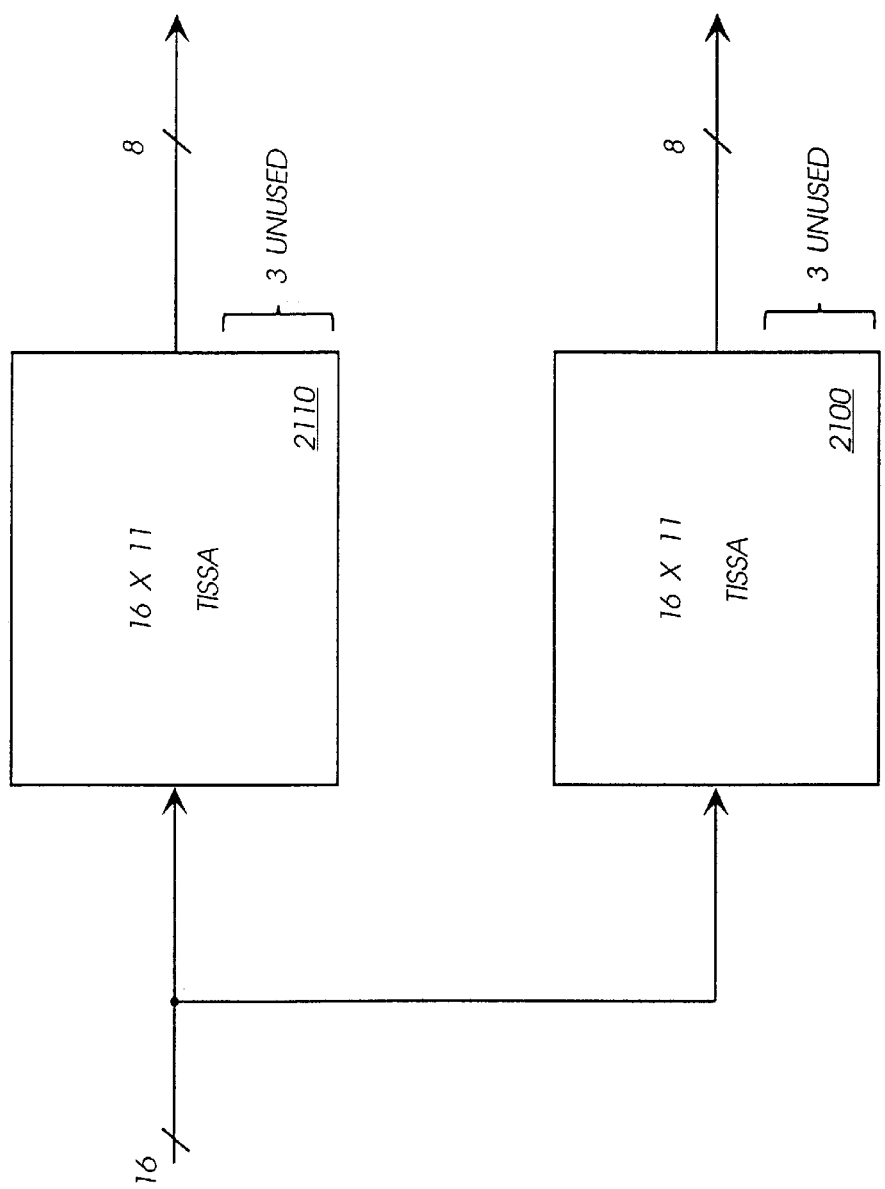
FIG. 21 illustrates one embodiment of cascaded 16×11 TISSAs to provide a 16×16 cross-connect.

FIG. 21 illustrates one embodiment of cascaded 16×11 TISSAs to provide a 16×16 cross-connect. In the example of FIG. 21 two 16×11 TISSAs are cascaded to provide a "square" 16×16 cross-connect; however, any cross-connect dimensions can be provided by using one or more 16×11 TISSAs. For a 16×16 cross-connect the 16 input lines are coupled to both TISSA 2100 and TISSA 2110. Both TISSAs operate as described above to provide time and space switching of the input signals. In one embodiment, three outputs of each of TISSA 2100 and TISSA 2110 are unused; however, in alternate embodiments, other configurations of output ports can be unused.

Figure 22:
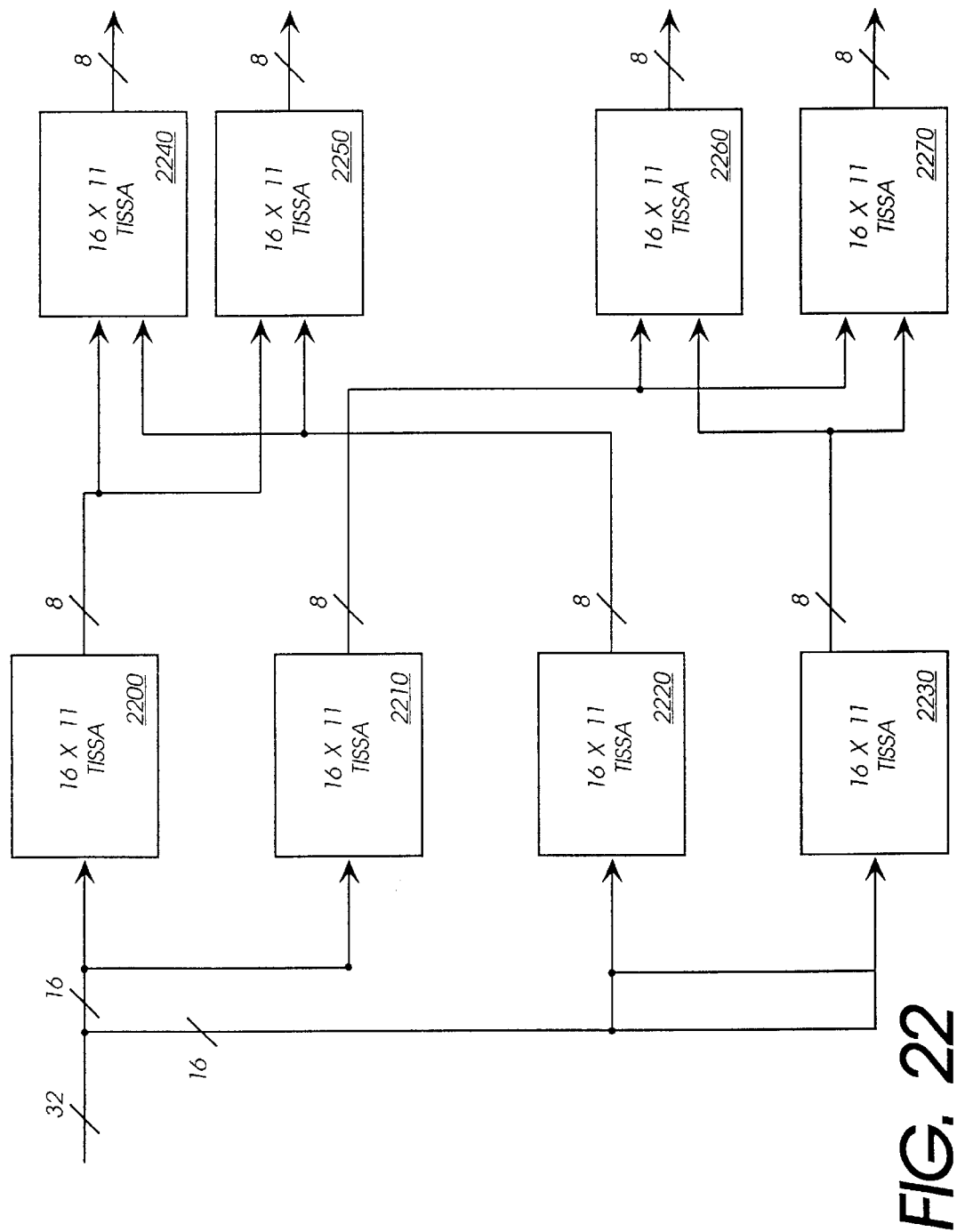
FIG. 22 illustrates one embodiment of cascaded 16×11 TISSAs to provide a 32×32 cross-connect.

FIG. 22 illustrates one embodiment of cascaded 16×11 cross-connects to provide a 32×32 cross-connect. The 32 input ports is divided into two groups of 16 ports each. One set of 16-bit ports is input to 16×11 TISSAs 2200 and 2210 in parallel. The second set of 16-bit ports is input to 16×11 TISSAs 2220 and 2230 in parallel. Each of TISSAs 2200, 2210, 2220 and 2230 generates an 8 output port. The output of TISSA 2200 and the output of TISSA 2220 are provided to 16×11 TISSAs 2240 and 2250 in parallel. Similarly, the output of TISSA 2210 and the output of TISSA 2230 are provided to 16×11 TISSAs 2260 and 2270 in parallel. Each of TISSAs 2240, 2250, 2260 and 2270 operate as described above to provide 8 port output.

Figure 23:
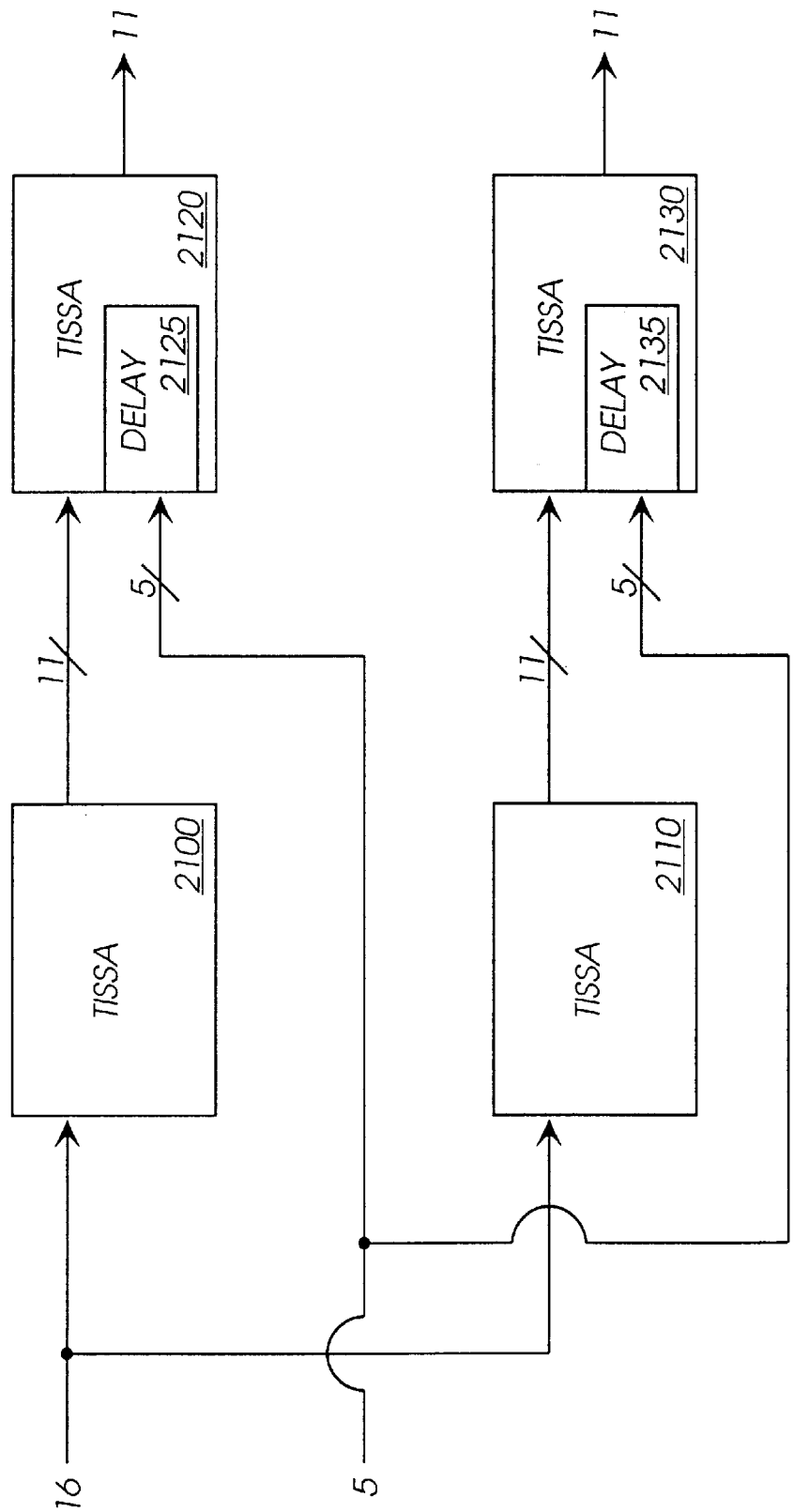
FIG. 23 illustrates one embodiment of cascaded 16×11 TISSAs to provide a 21×22 cross-connect.

FIG. 23 illustrates one embodiment of cascaded 16×11 TISSAs to provide a 21×22 cross-connect. A set of 16 input signals is provided to both TISSA 2300 and TISSA 2310. The 11 output signals from both TISSA 2300 and TISSA 2310 are input to TISSA 2320 and TISSA 2330. Five additional input signals are provided to both TISSA 2320 and TISSA 2330 via delay circuitry 2325 and 2335, respectively. Delay circuits 2325 and 2335 compensate for delay caused by TISSA 2300 and TISSA 2310 in switching the 16 input signals those TISSAs receive. In one embodiment, the delay provided by delay circuitry 2325 and 2335 is 48 clock cycles. TISSA 2320 and TISSA 2330 switch the signals received to each provide 11 output signals. Thus, four TISSAs can be interconnected to provide a 21×22 cross-connect.

Conclusion

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An integrated circuit having first and second sides opposite each other and third and fourth sides opposite each other, the integrated circuit comprising:

a first plurality of input/output (I/O) ports along the first side;

a plurality of queues coupled to the first plurality of I/O ports;

a control circuit coupled to the plurality of queues by a first bus extending from the plurality of queues toward the second side;

a second plurality of I/O ports along the third side and the fourth side; and a second bus coupled between the control circuit and the second plurality of I/O ports, wherein the first bus and the second bus are positioned such that the respective bus lines do not cross over each other;

wherein one or more of the second plurality of I/O parts includes:

a plurality of data lines;

a plurality of cells coupled in parallel to each of the plurality of data lines, the plurality of cells to select a predetermined bit in a sequence of data bits received via the plurality of data lines such that data output by the respective I/O ports is output according to a different format than data received via the plurality of data lines;

wherein each of the plurality of cells includes:

a space control register to indicate a selected data line from the plurality of data lines;

a multiplexer coupled to the space control register to pass the selected data line;

a time control register to indicate a selected bit from a sequence of bits received via the selected data line; a counter to count a number of bits from a predetermined bit in the sequence of bits; and a comparator coupled to the time control register and to the counter to generate a load signal in response to the time control register value being equal to the counter value; and a latch coupled to the multiplexer and to the comparator, the latch to latch a value of the selected data line in response to the load signal.

2. The integrated circuit of claim 1 wherein the first plurality of I/O ports are oriented along the first side and along the second and third sides.

3. The integrated circuit of claim 1 wherein the second plurality of I/O ports comprises a greater number of I/O ports than the first plurality of I/O ports.

4. The integrated circuit of claim 1 wherein the first plurality of I/O ports comprises a greater number of I/O ports than the second plurality of I/O ports.

5. The integrated circuit of claim 1 wherein the first plurality of I/O ports receive optical telecommunications signals in a first format and are transformed to a second format and communicated to the second plurality of I/O ports.

6. The integrated circuit of claim 1 wherein one or more of the cells further comprises a control circuit coupled to a second multiplexer, the control circuit and the second multiplexer together to select between a value output by the latch and a value received from another cell.

7. A method of laying out an integrated circuit having a first side and a second side opposite each other and a third side and a fourth side opposite each other, the method comprising:

positioning a first plurality of input/output (I/O) ports along the first side;

positioning a plurality of queues to be coupled to the first plurality of I/O ports;

positioning a first bus extending from the plurality of queues toward the second side to couple a control circuit to the plurality of queues;

positioning second plurality of I/O ports along the third side and the fourth side; and positioning a second bus between the control circuit and the second plurality of I/O ports to couple the control circuit to the second plurality of I/O ports, wherein the first bus and the second bus are positioned such that the respective bus lines do not cross over each other, wherein one or more of the second plurality of I/O ports are laid out comprising:

positioning a plurality of data lines from the second bus to provide data to the one or more of the second plurality of I/O ports; and positioning a plurality of cells to be coupled in parallel to each of the plurality of data lines, the plurality of cells to select a predetermined bit in a sequence of data bits received via the plurality of data lines such that data output by the respective I/O ports is output according to a different format than data received via the plurality of data lines, wherein each of the plurality of cells is laid out comprising:

positioning a space control register within the cell, the space control logic to indicate selected data line from the plurality of data lines;

positioning a multiplexer to be coupled to the space control register, the multiplexer to pass the selected data line;

positioning a time control register within the cell, the time control register to indicate a selected bit from a sequence of bits received via the selected data line;

positioning a counter within the cell, the counter to count a number of bits from a predetermined bit in the sequence of bits;

positioning a comparator to be coupled to the time control register and to the counter, the comparator to generate a load signal in response to the time control register value being equal to the counter value; and positioning a latch to be coupled to the multiplexer and to the comparator, the latch to latch a value of the selected data line in response to the load signal.

8. The method of claim 7 wherein the first plurality of I/O ports are positioned along the first side and along the second and third sides.

9. The method of claim 7 wherein the second plurality of I/O ports comprises a greater number of I/O ports than the first plurality of I/O ports.

10. The method of claim 7 wherein the first plurality of I/O ports comprises a greater number of I/O ports than the second plurality of I/O ports.

11. The method of claim 7 further comprising positioning a control circuit to be coupled to a second multiplexer, the control circuit and the second multiplexer together to select between a value output by the latch and a value received from another cell.

12. The integrated circuit according to claim 1, wherein said space control register and said time control register are two fields within a single register.

13. The integrated circuit according to claim 1, said space control register or said time control register being programmable.

14. The integrated circuit according to claim 6 said second multiplexer passing the value from the other cell except when said latch outputs a value.

15. The integrated circuit according to claim 1, said plurality of cells being interconnected in a cascade arrangement.

* * * * *